United States Patent
Yeager et al.

(10) Patent No.: US 9,133,374 B2
(45) Date of Patent: Sep. 15, 2015

(54) RESIN SYSTEMS FOR MAKING COMPOSITE PRODUCTS

(71) Applicant: Georgia-Pacific Chemicals LLC, Atlanta, GA (US)

(72) Inventors: Daniel C. Yeager, Smyrna, GA (US); Robert A. Breyer, Atlanta, GA (US); James H. Knight, Conyers, GA (US); Melissa J. Cannon, Ellenwood, GA (US); Paul S. Baxter, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 266 days.

(21) Appl. No.: 13/874,677

(22) Filed: May 1, 2013

(65) Prior Publication Data

US 2013/0295319 A1 Nov. 7, 2013

Related U.S. Application Data

(60) Provisional application No. 61/642,249, filed on May 3, 2012.

(51) Int. Cl.
| C09J 161/06 | (2006.01) |
| C09J 161/12 | (2006.01) |
| C09J 161/28 | (2006.01) |
| C09J 161/30 | (2006.01) |
| C08L 97/02  | (2006.01) |

(52) U.S. Cl.
CPC ............... *C09J 161/06* (2013.01); *C08L 97/02* (2013.01); *C09J 161/12* (2013.01); *C09J 161/28* (2013.01); *C09J 161/30* (2013.01); *C08L 2205/025* (2013.01); *Y10T 428/24066* (2015.01); *Y10T 428/31942* (2015.04); *Y10T 428/31949* (2015.04); *Y10T 428/31957* (2015.04)

(58) Field of Classification Search
CPC ....................................................... C09J 161/06
USPC .................. 428/106, 526, 528, 524; 524/541; 427/392
See application file for complete search history.

(56) References Cited

U.S. PATENT DOCUMENTS

| 4,409,293 A | 10/1983 | Williams |
| 4,915,766 A | 4/1990 | Baxter |
| 4,992,519 A | 2/1991 | Mukherjee |
| 5,362,842 A | 11/1994 | Graves et al. |
| 5,389,716 A | 2/1995 | Graves |
| 5,670,571 A | 9/1997 | Gabrielson et al. |
| 5,914,365 A | 6/1999 | Chang et al. |
| 6,008,150 A | 12/1999 | Thyssen et al. |
| 6,906,130 B2 | 6/2005 | Tutin et al. |
| 7,642,306 B2 | 1/2010 | Charbonneau et al. |
| 8,007,698 B2 | 8/2011 | Baxter et al. |
| 2003/0205330 A1 | 11/2003 | Foucht et al. |
| 2006/0009569 A1 | 1/2006 | Charbonneau et al. |
| 2006/0019024 A1 | 1/2006 | Freeman et al. |
| 2006/0130897 A1 | 6/2006 | Georgeson et al. |
| 2006/0138709 A1 | 6/2006 | Mbachu |
| 2008/0064284 A1 | 3/2008 | Srinivasan et al. |
| 2008/0064799 A1 | 3/2008 | Srinivasan et al. |
| 2008/0280787 A1 | 11/2008 | Rediger et al. |
| 2010/0171233 A1* | 7/2010 | Baxter et al. .................. 264/123 |
| 2010/0273917 A1* | 10/2010 | Breyer et al. .................. 524/14 |

FOREIGN PATENT DOCUMENTS

| WO | 2010056213 | | 5/2010 |
| WO | 2010056213 | A1 | 5/2010 |

OTHER PUBLICATIONS

Search Report dated Sep. 27, 2013 for Application No. PCT/US2013/039268.
Search Report dated Sep. 17, 2013 for Application No. PCT/US2013/039278.
Search Report dated Sep. 25, 2013 for Application No. PCT/US2013/039271.
International Search Report PCT/US2013/039278 mailed Sep. 17, 2013.

* cited by examiner

Primary Examiner — Daniel Lee
(74) Attorney, Agent, or Firm — Ram W. Sabnis

(57) ABSTRACT

Resin systems and methods for making and using same are provided. The resin system can include a first aqueous resin comprising at least two polymerized monomers and a second aqueous resin comprising at least two polymerized monomers. The first aqueous resin can be present in an amount of about 5 wt % to about 95 wt %, based on the total weight the resin system. The second aqueous resin can be present in an amount of about 5 wt % to about 95 wt %, based on the total weight the resin system. The at least two polymerized monomers of the first and second aqueous resins can be the same monomers.

20 Claims, No Drawings

RESIN SYSTEMS FOR MAKING COMPOSITE PRODUCTS

CROSS-REFERENCE TO RELATED APPLICATION

This application claims priority to U.S. Provisional Patent Application having Ser. No. 61/642,249, filed on May 3, 2012, which is incorporated by reference herein.

BACKGROUND

1. Field

Embodiments described herein generally relate to resin systems and methods for making and using same.

2. Description of the Related Art

Adhesives or resins typically used to make lignocellulose composite products, e.g., plywood, include formaldehyde based resins such as phenol-formaldehyde (PF). Recognized drawbacks of conventional phenol-formaldehyde resins can be a slow rate of cure and a tendency for dry out to occur. Additionally, the moisture concentration of the lignocellulose substrates, e.g., veneers, can tend to require the phenol-formaldehyde resin have a particular molar ratio of formaldehyde to phenol in order to produce a composite product having desired properties.

Depending, at least in part, on the particular veneers and/or veneer drying process, the optimal molar ratio of the phenol-formaldehyde resin can vary significantly. As such, depending on a particular veneer source and/or drying process the optimal molar ratio of the phenol-formaldehyde resin varies. As such, many phenol-formaldehyde reins with different molar ratios are currently prepared in order to accommodate the varying moisture content of the various veneers. The production of many phenol-formaldehyde resins is costly and time consuming.

There is a need, therefore, for improved resin systems for making composite products.

SUMMARY

Resin systems and methods for making and using same are provided. In at least one specific embodiment, the resin system can include a first aqueous resin comprising at least two polymerized monomers and a second aqueous resin comprising at least two polymerized monomers. The first aqueous resin can be present in an amount of about 5 wt % to about 95 wt %, based on the total weight of the resin system. The second aqueous resin can be present in an amount of about 5 wt % to about 95 wt %, based on the total weight the resin system. The at least two polymerized monomers of the first and second aqueous resins can be the same monomers.

In at least one specific embodiment, a method for making a composite product can include contacting a plurality of lignocellulose substrates with a resin system. The resin system can include a first aqueous resin comprising at least two polymerized monomers and second aqueous resin comprising at least two polymerized monomers. The first aqueous resin can be present in an amount of about 5 wt % to about 95 wt %, based on the total weight the resin system. The second aqueous resin can be present in an amount of about 5 wt % to about 95 wt %, based on the total weight the resin system. The at least two polymerized monomers of the first and second aqueous resins can be the same monomers. The method can also include at least partially curing the resin system to produce a composite product.

In at least one specific embodiment, a composite product can include a plurality of substrates and an at least partially cured binder composition, where the binder composition, prior to curing, includes a first aqueous resin of at least two polymerized monomers and second aqueous resin of at least two polymerized monomers. The first aqueous resin can be present in an amount of about 5 wt % to about 95 wt %, based on the total weight the resin system, the second aqueous resin can be present in an amount of about 5 wt % to about 95 wt %, based on the total weight the resin system. The at least two polymerized monomers of the first and second aqueous resins can be the same monomer.

DETAILED DESCRIPTION

It has been surprisingly and unexpectedly discovered that blending two or more resins having different molar ratios of polymerized monomers and/or different molecular weights, with respect to one another, together can provide resin systems with improved performance characteristics. For example, the resin systems can exhibit faster cure rates without sacrificing bond strength. In another example, the resin systems can form bonds having a desired strength between veneers having high moisture content. As such, the time required to dry the veneer can be reduced and/or eliminated thus reducing costs and/or processing time. The ability to prepare composite products, e.g., laminates, with high moisture content veneers can reduce or minimize the criticality of moisture control in veneer preparation.

The resin system can be made by mixing, blending, stirring, or otherwise combining two or more resins or "component resins" with one another, where each resin or "component resin" has a different molar ratio of polymerized monomers. The first resin and the second resin can each include at least two monomers, e.g., a first monomer and a second monomer, that are the same with respect to the first and second resins. The molar ratio of the first and second monomers in the first resin can be different as compared to the molar ratio of the first and second monomers in the second resin. For example, the first resin can have molar ratio of the first monomer to the second monomer of about 1.8:1 and the second resin can have a molar ratio of the first monomer to the second monomer of about 2.6:1. These two resins can be combined together in any desired ratio, e.g., a 50/50 mix, based on the combined solids weight of the first resin and the second resin, yielding a resin system with a composite molar ratio of the first monomer and the second monomer, e.g., 2.2:1 when combined with one another. In one or more embodiments, the resin system can include the first resin and the second resin, and optionally any number of additional resins, e.g., a third resin, a fourth resin, a fifth resin, or more, where the resins differ from one another by the molar ratio of their polymerized monomers.

The resin system can also be made by mixing, blending, stirring, or otherwise combining two or more resins with one another, where each resin has a different molecular weight, e.g., a high molecular weight and a low molecular weight, with respect to one another. The molecular weight of the resins can be measured and referred to as its weight average molecular weight (Mw), number average molecular weight (Mn), and/or a z-average molecular weight (Mz). The first resin and the second resin can have monomodal molecular weights (Mw, Mn, and/or Mz). For example, the first resin can have a first monomodal weight average molecular weight and the second resin can have a second monomodal weight average molecular weight, where the weight average molecular weight of the first and second resins are different. These two resins can be blended together yielding a resin system having a bimodal weight average molecular weight. In one or more embodiments, the resin system can include the first resin and the second resin, and optionally any number of additional resins, e.g., a third resin, a fourth resin, a fifth resin, or more, where the resins differ from one another by molecular weight.

The first resin can be present in the resin system in an amount of about 0.1 wt % to about 99.9 wt %, based on the combined solids weight of the first resin and the second resin. For example, the first resin can be present in an amount from a low of about 0.5 wt %, about 1 wt %, about 5 wt %, about 10 wt %, about 15 wt %, about 25 wt %, or about 35 wt % to a high of about 65 wt %, about 75 wt %, about 85 wt %, or about 95 wt %, based on the combined solids weight of the first and second resins. In another example, the first resin can be present from about 0.5 wt % to about 10 wt %, about 10 wt % to about 20 wt %, about 20 wt %, to about 30 wt %, about 40 wt % to about 60 wt %, about 60 wt % to about 80 wt %, about 80 wt % to about 90 wt %, or about 90 wt % to about 99.5 wt %, based on the combined solids weight of the first and second resins. In another example, the first resin can be present in an amount of from about 5 wt % to about 25 wt %, about 20 wt % to about 45 wt %, about 30 wt % to about 55 wt %, about 45 wt % to about 70 wt %, about 40 wt % to about 80 wt %, or about 65 wt % to about 85 wt %, based on the combined solids weight of the first and second resins. The second resin can be present in an amount from a low of about 0.5 wt %, about 1 wt %, about 5 wt %, about 10 wt %, about 15 wt %, about 25 wt %, or about 35 wt % to a high of about 65 wt %, about 75 wt %, about 85 wt %, or about 95 wt %, based on the combined solids weight of the first and second resins. In another example, the second resin can be present in an amount from about 0.5 wt % to about 10 wt %, about 10 wt % to about 20 wt %, about 20 wt %, to about 30 wt %, about 40 wt % to about 60 wt %, about 60 wt % to about 80 wt %, about 80 wt % to about 90 wt %, or about 90 wt % to about 99.5 wt %, based on the combined solids weight of the first and second resins. In another example, the second resin can be present from about 5 wt % to about 25 wt %, about 20 wt % to about 45 wt %, about 30 wt % to about 55 wt %, about 45 wt % to about 70 wt %, about 40 wt % to about 80 wt %, or about 65 wt % to about 85 wt %, based on the combined solids weight of the first and second resins. When three or more resins are combined to provide the resin blend, the three or more resins can be present in any amount. For example, in the context of a resin system that includes the first resin, the second resin, and a third resin, the first resin can be present in an amount of from about 0.5 wt % to about 99 wt %, the second resin can be present in an amount of from about 0.5 wt % to about 99 wt %, and the third resin can be present in an amount of from about 0.5 wt % to about 99 wt %, based on the combined solids weight of the first, second, and third resins. For simplicity and ease of description, the resin system will be further discussed and described in the context of a two resin system or a "two component" resin system, i.e., as a resin blend having a first resin and a second resin, combined with one another.

The resin system can be made by mixing, contacting, stirring, blending, or otherwise combining two or more resins with one another. The resins can be a liquid or a solution of the resin. The solvent can be water, an organic solvent, or a combination thereof. For example, the resins and/or the resin system can be a in a liquid phase or solution. In at least one example, the resins and/or the resin system can be in the form of an aqueous solution.

Various different types of processes and/or reactor configurations can be used to produce the resin system, including, but not limited to, series reactors (i.e., sequentially-configured reactors) and single reactors. The resin system, for example, can be a reactor blend (also sometimes referred to as a chemical blend). A reactor blend is a blend that is formed (polymerized) in a single reactor. The resin system can also be a physical blend, i.e., a composition formed by the post-polymerization blending or mixing together of two or more resins, e.g., at least one high molecular weight resin and at least one low molecular weight resin, where each of the resins is polymerized using the same catalyst system or different catalyst systems.

Blending resins can be used to make a resin system having one or more improved properties relative to either the first resin, the second resin, or a resin made to have the same molar ratio and/or molecular weight distribution as the resin system, thus yielding a resin system that can be more suited to the requirements for a particular application. While not wishing to be bound by any particular theory, it is believed that the individual resins bring their unique chemical and/or physical properties to the resin system. Also, the resins can produce synergistic effects with one another for certain properties without detrimentally affecting other properties.

Many kinds of resins can be used make the resin system. The resins can include, but are not limited to, phenol-formaldehyde resins (PF), resorcinol-formaldehyde (RF), phenol-resorcinol-formaldehyde resins (PRF), urea-formaldehyde resins (UF), phenol-urea-formaldehyde resins (PUF), melamine-formaldehyde resins (MF), and melamine-urea-formaldehyde resins (MUF). For example, the resin system can be made from two PF resins mixed together to make a PF/PF resin system. In other examples, the resin system can be an RF/RF, PRF/PRF, UF/UF, PUF/PUF, MF/MF, MUF/MUF, PF/PRF, PF/PUF, PRF/RF, UF/MUF, and MF/MUF. In other examples, the resin system can include three resins, e.g., PF/PRF/RF resin system.

The resin systems can include a first resin composed of at least two polymerized monomers and a second resin composed of at least two polymerized monomers, where the at least two polymerized monomers of the first and second resins are the same. The molar ratio between the at least two polymerized monomers in the first and/or second resins can be the same or different. The molar ratio between the at least two polymerized monomers in the first and/or second resins can widely vary. For example, the molar ratio of the first monomer to the second monomer of the at least two monomers can be from a low of about 0.6:1, about 0.9:1, or about 1.2:1 to a high of about 1.9:1, about 2.1:1, about 2.3:1, or about 2.8:1. In another example, the molar ratio of the first monomer to the second monomer of the at least two monomers can be from about 0.7:1 to about 2.7:1, about 0.8:1 to about 2.5:1, about 1:1 to about 2.4:1, about 1.1:1 to about 2.6:1, or about 1.3:1 to about 2:1. In other example, the molar ratio of the first monomer to the second monomer of the at least two monomers can be from about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

The first resin and the second resin can have a first and second weight average molecular weight, respectively. The first and second weight average molecular weights can be the same or different. As such, the resin system that includes the first and second weight average molecular weights can be bimodal. Said another way, the first and second resins can have different weight average molecular weights (Mw), different number average molecular weight (Mn), and/or z-average molecular weight (Mz). Mw, Mn, and Mz can be measured using gel permeation chromatography ("GPC"), also known as size exclusion chromatography (SEC). This technique utilizes an instrument containing columns packed with porous beads, an elution solvent, and detector in order to separate polymer molecules of different sizes, and is well known to those skilled in the art.

The resin system can have a molecular weight distribution (MWD) or polydispersity index (PDI) from a low of about 1, about 1.75, or about 2.5 to a high of about 2.75, about 3.5, or about 6.5. In another example, the resin system can have a polydispersity index from about 1 to about 1.75, about 1.75 to about 2.5, about 2.5 to about 2.75, about 2.75 to about 3.25, about 3.25 to about 3.75, or about 3.75 to about 6.5. In another example, resin system can have a polydispersity index of about 1 to about 1.5, about 1.5 to about 2.5, about 2.5 to about 3, about 3 to about 3.35, about 3.35 to about 3.9, or about 3.9 to about 6.5. The term "MWD" (molecular weight distribution) means the same thing as "PDI" (polydispersity index). The term "MWD" (PDI) is intended to have the broadest definition that persons in the pertinent art have given that term as reflected in one or more printed publications or issued patents. The MWD (PDI) is the ratio of weight-average molecular weight (Mw) to number-average molecular weight (Mn), i.e., Mw/Mn The first and second resins can be mixed so that the resulting resin system has a non-volatile material (NVM) content or "solids" content of at least about 20 wt %, at least about 30 wt %, at least about 35 wt %, or at least about 45 wt %, based on the weight of the resin system. The non-volatile material or "solids" content can range from a low of about 20 wt %, about 30 wt %, about 40 wt %, about 45 wt %, or about 50 wt % to a high of about 55 wt %, about 60 wt %, about 65 wt %, about 70 wt %, about 75 wt %, or about 80 wt %, based on the weight of the resin system. For example, resin system can have a non-volatile material or solids content from about 40 wt % and about 48 wt %, about 40 wt % and about 44 wt %, about 45 wt % and about 65 wt %, or about 50 wt % and about 60 wt %, based on the weight of the resin system. As used herein, the NVM or solids content of a composition can be measured by the weight loss upon heating a small, e.g., 1-5 gram, sample of PF resin at about 125° C. for about 105 minutes.

The viscosity of the resin system can widely vary. For example, the viscosity of the resin system can range from a low of about 1 centipoise (cP), about 100 cP, about 250 cP, about 500 cP, or about 700 cP to a high of about 1,000 cP, about 1,250 cP, about 1,500 cP, about 2,000 cP, or about 2,200 cP at a temperature of about 25° C. In another example, the resin system can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the resin system can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity can be measured using a Brookfield viscometer. For example, the Brookfield Viscometer can be equipped with a small sample adapter such a 10 mL adapter and the appropriate spindle to maximize torque such as a spindle no. 31.

The resin system can have a pH from a low of about 1, about 2, about 3, about 4, about 5, about 6, about 7 to a high of about 8, about 9, about 10, about 11, about 12, or about 13. In another example, resin system can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

The resin system, in addition to the first and second resins can include, but is not limited to, one or more other resins and/or additives. For example, the one or more resins or additives can be combined with the first resin and the second resin to produce the resin system. Illustrative additives can include, but are not limited to, waxes and/or other hydrophobic additives, water, filler material(s), extenders, surfactants, release agents, dyes, fire retardants, formaldehyde scavengers, biocides, or any combination thereof. For composite wood products, such as plywood, typical filler material(s) can include, but are not limited to, ground pecan and/or walnut shells, and typical extenders can include, for example, wheat flour. Other suitable extenders can include, but are not limited to, polysaccharides, sulfonated lignins, and the like. Illustrative polysaccharides can include, but are not limited to, starch, cellulose, gums, such as guar and xanthan, alginates, pectin, gellan, or any combination thereof. Suitable polysaccharide starches can include, for example maize or corn, waxy maize, high amylose maize, potato, tapioca, and wheat starch. Other starches such as genetically engineered starches can include, but are not limited to, high amylose potato and potato amylopectin starches. Illustrative sulfonated lignins can include, but are not limited to, sodium lignosulfonate and ammonium lignosulfonate.

If the resin system includes one or more additives, the amount of each additive can be from a low of about 0.01 wt % to a high of 50 wt %, based on the total weight of the resin system. For example, the amount of any given additive can range from a low of about 0.01 wt %, about 0.05 wt %, about 0.1 wt %, about 0.5 wt %, or about 1 wt % to a high of about 3 wt %, about 5 wt %, about 7 wt %, or about 9 wt %, based on the total weight of the resin system. In another example, the amount of any given additive can be from a low of about 1 wt %, about 5 wt %, about 10 wt %, about 15 wt %, or about 20 wt % to a high of about 25 wt %, about 30 wt %, about 35 wt %, about 40 wt %, or about 45 wt %, based on the total weight of the resin system.

One or more phenol-formaldehyde (PF) resins can be used to make the resin system. The phenol-formaldehyde resin can be produced via any suitable process. For example, the phenol-formaldehyde resin can be prepared by reacting a molar excess of formaldehyde with phenol under alkaline reaction conditions. Formaldehyde can be used in an amount of about 0.5 to about 4.5 moles per mole of phenol, with preferred ranges dependent, at least in part, on the intended application or use of the resin.

A variety of techniques are known in the art for reacting phenol and formaldehyde in the presence of the alkaline catalyst. The resin can be reacted in stages with separate partial additions of either one or both of the reactants and the alkaline catalyst. For example, phenol can be reacted with a portion of the formaldehyde in the presence of a portion of the alkaline catalyst. After an initial exothermic reaction, additional amounts of alkaline catalyst and formaldehyde can be added to the reaction mixture and the reaction can be continued while controlling the reaction temperature. Once all of the reactants and catalyst have been added, the reaction can be allowed to proceed to a suitable end point, which can be determined by measuring the refractive index of the reaction mixture, by measuring the viscosity of the reaction mixture, by a combination thereof, or any other suitable reaction end-point determination, as recognized by those skilled in the art.

Preferably, hydroxybenzene (phenol) can be the phenol reactant, although substituted phenols such as cresol and higher functional phenols such as resorcinol or bisphenol-A, can be used. As such, the phenol-formaldehyde resin can also be or include resorcinol such as phenol-resorcinol-formaldehyde resin or resorcinol-formaldehyde resin. Specific examples of suitable phenolic compounds (phenol monomer) for replacing a portion or all of the phenol used in preparing a phenol-aldehyde polymer can include, but are not limited to, resorcinol, bis-phenol A, bis-phenol F, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof. Preferably, about 80 wt % or more, about 90 wt % or more, or about 95 wt % or more of the phenol monomer comprises phenol (monohydroxybenzene).

Formaldehyde suitable for making a PF resin can be available in many forms. The formaldehyde can be supplied as an aqueous solution known in the art as "formalin." Formalin can contain from about 37% to about 50% by weight formaldehyde. Other forms of formaldehyde such as paraformaldehyde also can be used. Other aldehydes can be used in lieu of or in combination with formaldehyde. For example, suitable aldehydes that can be used in lieu of or in combination with formaldehyde can include, but are not limited to, aliphatic aldehydes such as acetaldehyde and propionaldehyde, aromatic aldehydes such as benzylaldehyde and furfural, glyoxal, crotonaldehyde, or any combination thereof.

One or more bases or base compounds can be used to catalyze the polymerization of the phenol and formaldehyde. The base can include, but is not limited to, one or more alkali metal and/or alkali earth hydroxides, such as lithium hydroxide, sodium hydroxide and potassium hydroxide; one or more alkali metal carbonates, such as calcium carbonate, sodium carbonate, and potassium carbonate; and/or one or more amines. For example, the base can be or include an amine, such triethylenetetramine. The catalyst concentrations can range from about 0.2 wt % to about 6 wt %, preferably from about 0.5 wt % to about 3 wt %, based on the combined weight of the phenol, formaldehyde, and catalyst. In one example, at least about 0.005 mol of catalyst per mol of phenol can be used. In another example, an amount of the catalyst can range from about 0.01 mol to about 1 mol per mol of phenol. The catalyst can be added initially to the phenol-formaldehyde reaction mixture or the catalyst can be added incrementally in two or more additions or continuously over time. These materials can be reacted to a suitable endpoint, e.g., a predetermined viscosity. The phenol/formaldehyde-based resin can be cooled under vacuum. The phenol/formaldehyde-based resin can be distilled to remove at least a portion of any water present as a result of the added formaldehyde solution or produced by the polymerization reaction.

The polymerization of the phenol and formaldehyde can be carried out for a time from a low of about 1 minute, about 10 minutes, or about 30 minutes to a high of about 8 hours, about 10 hours, or about 20 hours. For example, polymerization of the phenol and formaldehyde can be carried out for a time of about 10 minutes to about 240 minutes, about 20 minutes to about 180 minutes, about 10 minutes to about 1 hour, about 1 hour to about 7 hours, or about 2 hours to about 20 hours. The polymerization can be carried out until the phenol-formaldehyde resin exhibits one or more desired properties. For example, the polymerization of the phenol and formaldehyde can be carried out until the phenol-formaldehyde resin has a desired viscosity.

The phenol-formaldehyde resin can have an amount of free formaldehyde of about 0.1 wt % to about 6 wt %. For example, the phenol-formaldehyde resin can have a concentration of free formaldehyde from a low of about 0.1 wt %, about 0.5 wt %, about 1 wt %, or about 2 wt % to a high of about 3 wt %, about 5 wt %, or about 6 wt %, based on the total weight of the phenol-formaldehyde resin. The phenol-formaldehyde resin can have an amount of free formaldehyde of less than 5 wt %, less than 3 wt %, less than 1 wt %, less than 0.5 wt %, less than 0.3 wt %, less than 0.1 wt %, less than 0.05 wt %, or less than 0.01 wt %, based on the total weight of the phenol-formaldehyde resin.

The phenol-formaldehyde resin can have an amount of free phenol of about 0.1 wt % to about 20 wt %. For example, the phenol-formaldehyde resin can have a concentration of free phenol from a low of about 0.1 wt %, about 0.5 wt %, about 1 wt %, or about 2 wt % to a high of about 5 wt %, about 7 wt %, about 10 wt %, or about 15 wt %, based on the total weight of the phenol-formaldehyde resin. The phenol-formaldehyde resin can have an amount of free phenol of less than 5 wt %, less than 3 wt %, less than 1 wt %, less than 0.5 wt %, less than 0.3 wt %, less than 0.1 wt %, less than 0.05 wt %, or less than 0.01 wt %, based on the total weight of the phenol-formaldehyde resin.

Urea can be added to the phenol-formaldehyde resin to reduce the free formaldehyde content and advantageously impact resin curing. Urea is available in many forms that can be used to make a resin. Solid urea, such as prill, and urea solutions, such as aqueous solutions, can be used. The urea can be added in a range from a low of about 0.1 wt %, about 0.5 wt %, about 1 wt %, or about 2 wt % to a high of about 5 wt %, about 7 wt %, about 10 wt %, or about 15 wt %, based on the total weight of the phenol-formaldehyde resin. In other example, the urea can be added to phenol-formaldehyde resin in a range 0.1 wt % to about 1 wt %, about 1 wt % to about 2 wt %, about 2 wt % to about 5 wt %, about 5 wt % to about 10 wt %, about 10 wt % to about 15 wt %, or about 15 wt % to about 20 wt %, based on the total weight of the phenol-formaldehyde resin. The urea can be added to the phenol-formaldehyde resin at room temperature or at an elevated temperature, e.g., from about 30° C. to about 60° C.

The phenol-formaldehyde resin can have a molar ratio of formaldehyde to phenol (F:P) from of a low of about 0.6:1, about 0.9:1, or about 1.2:1 to a high of about 1.9:1, about 2.1:1, about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1. In other example, the phenol-formaldehyde resin can have a molar ratio of formaldehyde to phenol of about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

The resorcinol-formaldehyde resin can have a molar ratio of formaldehyde to resorcinol (F:R) from of a low of about 0.2:1, about 0.9:1, or about 1.2:1 to a high of about 1.9:1, about 2.1:1, about 2.3:1, or about 2.8:1. For example, the resorcinol-formaldehyde resin can have a molar ratio of formaldehyde to resorcinol of about 0.7:1 to about 2.7:1, about 0.8:1 to about 2.5:1, about 1:1 to about 2.4:1, about 1.1:1 to about 2.6:1, or about 1.3:1 to about 2:1. In other example, the resorcinol-formaldehyde resin can have a molar ratio of formaldehyde to resorcinol of about 0.2:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

The phenol-resorcinol-formaldehyde resin can have a molar ratio of formaldehyde to phenol+resorcinol (F:(P+R)) from of a low of about 0.2:1, about 0.9:1, or about 1.2:1 to a high of about 1.9:1, about 2.1:1, about 2.3:1, or about 2.8:1. For example, the phenol-resorcinol-formaldehyde can have a molar ratio of formaldehyde to phenol+resorcinol of about 0.7:1 to about 2.7:1, about 0.8:1 to about 2.5:1, about 1:1 to about 2.4:1, about 1.1:1 to about 2.6:1, or about 1.3:1 to about 2:1. In other example, the phenol-resorcinol-formaldehyde resin can have a molar ratio of formaldehyde to phenol+resorcinol of about 0.2:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

The phenol-formaldehyde resin can have a weight average molecular weight from a low of about 200, about 300, or about 400 to a high of about 1,000, about 2,000, or about 6,000. In another example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. In another example, phenol-formaldehyde resin can have a weight average molecular weight of about 175 to about 800, about 700 to about 3,330, about 1,100 to about 4,200, about 230 to about 550, about 425 to about 875, or about 2,750 to about 4,500.

The phenol-formaldehyde resin can have a number average molecular weight from a low of about 200, about 300, or about 400 to a high of about 1,000, about 2,000, or about 6,000. In another example, the phenol-formaldehyde resin can have a number average molecular weight from about 250 to about 450, about 450 to about 550, about 550 to about 950, about 950 to about 1,500, about 1,500 to about 3,500, or about 3,500 to about 6,000. In another example, the phenol-formaldehyde resin can have a number average molecular weight of about 175 to about 800, about 700 to about 3,000, about 1,100 to about 2,200, about 230 to about 550, about 425 to about 875, or about 2,000 to about 2,750.

The phenol-formaldehyde resin can have a z-average molecular weight from a low of about 200, about 300, or about 400 to a high of about 1,000, about 2,000, or about 9,000. In another example, the phenol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. In another example, the phenol-formaldehyde resin can have a z-average molecular weight of about 175 to about 800, about 700 to about 3,330, about 1,100 to about 4,200, about 230 to about 550, about 425 to about 875, or about 4,750 to about 8,500.

The resorcinol-formaldehyde resin can have a weight average molecular weight from a low of about 200, about 300, or about 400 to a high of about 1,000, about 2,000, or about 6,000. In another example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. In another example, phenol-formaldehyde resin can have a weight average molecular weight of about 175 to about 800, about 700 to about 3,330, about 1,100 to about 4,200, about 230 to about 550, about 425 to about 875, or about 2,750 to about 4,500.

The resorcinol-formaldehyde resin can have a number average molecular weight from a low of about 200, about 300, or about 400 to a high of about 1,000, about 2,000, or about 6,000. In another example, the resorcinol-formaldehyde resin can have a number average molecular weight from about 250 to about 450, about 450 to about 550, about 550 to about 950, about 950 to about 1,500, about 1,500 to about 3,500, or about 3,500 to about 6,000. In another example, the resorcinol-formaldehyde resin can have a number average molecular weight of about 175 to about 800, about 700 to about 3,000, about 1,100 to about 2,200, about 230 to about 550, about 425 to about 875, or about 2,000 to about 2,750.

The resorcinol-formaldehyde resin can have a z-average molecular weight from a low of about 200, about 300, or about 400 to a high of about 1,000, about 2,000, or about 9,000. In another example, the resorcinol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. In another example, the resorcinol-formaldehyde resin can have a z-average molecular weight of about 175 to about 800, about 700 to about 3,330, about 1,100 to about 4,200, about 230 to about 550, about 425 to about 875, or about 4,750 to about 8,500.

The phenol-resorcinol-formaldehyde resin can have a weight average molecular weight from a low of about 200, about 300, or about 400 to a high of about 1,000, about 2,000, or about 6,000. In another example, the phenol-resorcinol-formaldehyde resin can have a weight average molecular weight from about 250 to about 450, about 450 to about 550, about 550 to about 950, about 950 to about 1,500, about 1,500 to about 3,500, or about 3,500 to about 6,000. In another example, phenol-resorcinol-formaldehyde resin can have a weight average molecular weight of about 175 to about 800, about 700 to about 3,330, about 1,100 to about 4,200, about 230 to about 550, about 425 to about 875, or about 2,750 to about 4,500.

The phenol-resorcinol-formaldehyde resin can have a number average molecular weight from a low of about 200, about 300, or about 400 to a high of about 1,000, about 2,000, or about 6,000. In another example, the phenol-resorcinol-formaldehyde resin can have a number average molecular weight from about 250 to about 450, about 450 to about 550, about 550 to about 950, about 950 to about 1,500, about 1,500 to about 3,500, or about 3,500 to about 6,000. In another example, the phenol-resorcinol-formaldehyde resin can have a number average molecular weight of about 175 to about 800, about 700 to about 3,000, about 1,100 to about 2,200, about 230 to about 550, about 425 to about 875, or about 2,000 to about 2,750.

The phenol-resorcinol-formaldehyde resin can have a z-average molecular weight from a low of about 200, about 300, or about 400 to a high of about 1,000, about 2,000, or about 9,000. In another example, the phenol-resorcinol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. In another example, the phenol-resorcinol-formaldehyde resin can have a z-average molecular weight of about 175 to about 800, about 700 to about 3,330, about 1,100 to about 4,200, about 230 to about 550, about 425 to about 875, or about 4,750 to about 8,500.

The phenol-formaldehyde resin can have a polydispersity index from a low of about 1, about 1.75, or about 2.5 to a high of about 2.75, about 3.5, or about 4.5. In another example, the phenol-formaldehyde resin can have a polydispersity index from about 1 to about 1.75, about 1.75 to about 2.5, about 2.5 to about 2.75, about 2.75 to about 3.25, about 3.25 to about 3.75, or about 3.75 to about 4.5. In another example, phenol-formaldehyde resin can have a polydispersity index of about 1 to about 1.5, about 1.5 to about 2.5, about 2.5 to about 3, about 3 to about 3.35, about 3.35 to about 3.9, or about 3.9 to about 4.5.

The resorcinol-formaldehyde resin can have a polydispersity index from a low of about 1, about 1.75, or about 2.5 to a high of about 2.75, about 3.5, or about 4.5. In another example, the resorcinol-formaldehyde resin can have a polydispersity index from about 1 to about 1.75, about 1.75 to about 2.5, about 2.5 to about 2.75, about 2.75 to about 3.25, about 3.25 to about 3.75, or about 3.75 to about 4.5. In another example, resorcinol-formaldehyde resin can have a polydispersity index of about 1 to about 1.5, about 1.5 to about 2.5, about 2.5 to about 3, about 3 to about 3.35, about 3.35 to about 3.9, or about 3.9 to about 4.5.

The phenol-resorcinol-formaldehyde resin can have a polydispersity index from a low of about 1, about 1.75, or about 2.5 to a high of about 2.75, about 3.5, or about 4.5. In another example, the phenol-resorcinol-formaldehyde resin can have a polydispersity index from about 1 to about 1.75, about 1.75 to about 2.5, about 2.5 to about 2.75, about 2.75 to about 3.25, about 3.25 to about 3.75, or about 3.75 to about 4.5. In another example, phenol-resorcinol-formaldehyde resin can have a polydispersity index of about 1 to about 1.5, about 1.5 to about 2.5, about 2.5 to about 3, about 3 to about 3.35, about 3.35 to about 3.9, or about 3.9 to about 4.5.

The reaction can be conducted in an aqueous solution. The reaction can be conducted so that the resulting phenol-formaldehyde resin has a solids content of at least about 20 wt %, at least about 30 wt %, at least about 35 wt %, or at least about 45 wt %, based on the weight of the PF resin solution. The solids content can range from a low of about 20 wt %, about 30 wt %, about 40 wt %, about 45 wt %, or about 50 wt % to a high of about 55 wt %, about 60 wt %, about 65 wt %, about 70 wt %, about 75 wt %, or about 80 wt %, based on the weight of the PF resin solution. For example, PF resin solutions can have a solids content from about 40 wt % and about 48 wt %, about 40 wt % and about 44 wt %, about 45 wt % and about 65 wt %, or about 50 wt % and about 60 wt %, based on the weight of the PF resin solution.

The viscosity of the phenol-formaldehyde resin can widely vary. For example, the viscosity of the phenol-formaldehyde resin can range from a low of about 1 cP, about 100 cP, about 250 cP, about 500 cP, or about 700 cP to a high of about 1,000 cP, about 1,250 cP, about 1,500 cP, about 2,000 cP, or about 2,200 cP at a temperature of about 25° C. In another example, the phenol-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity can be determined using a Brookfield viscometer. For example, the Brookfield Viscometer can be equipped with a small sample adapter such a 10 mL adapter and the appropriate spindle to maximize torque such as a spindle no. 31.

The phenol-formaldehyde resin can have pH from a low of about 1, about 2, about 3, about 4, about 5, about 6, about 7 to a high of about 8, about 9, about 10, about 11, about 12, or about 13. In another example, phenol-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

The phenol-formaldehyde resin can have a gel time, working life, or pot life from a low of about 2 minutes, about 5 minutes, about 10 minutes, about 30 minutes, or about 1 hour to a high of about 2 hours, about 3 hours, about 5 hours, about 9 hours, about 12 hours, about 24 hours, about 36 hours, about 48 hours or about 72 hours. For example, the phenol-formaldehyde resin can have a gel time or pot life from about 10 minutes to about 240 minutes, about 20 minutes to about 180 minutes, about 30 minutes to about 4 hours, about 1 hour to about 9 hours, about 2 hours to about 24 hours, about 2 hours to about 12 hours, about 3 hours to about 36 hours, about 24 hours to about 48 hours, or about 48 hours to about 72 hours In another example, the phenol-formaldehyde resin can have a gel time or pot life less than about 240 minutes or less than about 210 minutes, or less than about 24 hours, but at least 5 minutes, at least 10 minutes, at least 1 hour, at least 2 hours, or at least 6 hours. In at least one specific example, the phenol-formaldehyde resin can have a pot life from about 80 minutes to about 120 minutes in the winter time or about 1 to about 24 hours in the summer time. In at least one other specific example, the phenol-formaldehyde resin can have a pot life from about 2 minutes to about 1 hour, about 2 hours to about 12 hours, or about 12 hours to about 72 hours. The gel time of the phenol-formaldehyde resin can be determined according to any suitable method.

One suitable method for determining or estimating the gel time of the phenol-formaldehyde resin, resorcinol formaldehyde resin, phenol-resorcinol-formaldehyde resin, or other resin can be as follows. A sample of the resin, e.g., about 20 g to about 30 g can be added to an appropriate container, e.g., a beaker, a 2.5 cm×11.5 cm centrifuge tube, or the like, and the temperature can be adjusted to about 25° C. The container can be tapped to remove air bubbles from the resin. The container can be placed in a water bath (to maintain the temperature of the resin at about 25° C.) under a gel timer equipped with a plunger. The surface of the resin should be below the surface of the water. A ring or other appropriate device can be used to position and hold the container in the gel time measuring device. The end of the gel timer plunger can be immersed in the resin and centered within the tube. The gel timer can be turned on. The time at which the gel timer stops can be recorded. A suitable gel timer can include the Techne Gelation Timer, model no. F925P.

Another suitable method for determining or estimating the gel time of the resin can be as follows. The desired amount of resin can be added to a beaker and mixed. The timer can be started when mixing begins. The temperature of the resin can be adjusted to about 25° C. A spindle can be inserted into the beaker and centered therein and attached to the viscometer. The viscometer can be started and the viscosity can be recorded periodically, e.g., every 2 minutes, until the resin reaches a desired viscosity, e.g., 100,000 cP. When the resin reaches the desired viscosity the viscometer can be stopped and the spindle can be removed and cleaned. A suitable viscometer can include a Brookfield Viscometer, Model LVF, with a number 4 spindle or equivalent. The resin can be placed under the viscometer; the viscometer can be started, and after about 2 minute the viscosity pointer can be locked and the viscosity periodically recorded until the desired viscosity is reached.

Suitable phenol-formaldehyde resins can be as discussed and described in U.S. Patent Application Publication Nos. 2008/0064799 and 2008/0064284. Other phenol-formaldehyde resins can be prepared under acidic reaction conditions, such as novolac resins and inverted novolac resins. Suitable novolac resins and inverted novolac resins can be used as discussed and described in U.S. Pat. Nos. 5,670,571 and 6,906,130, and U.S. Patent Application Publication No. 2008/0280787.

Urea-formaldehyde (UF) resins can be used as resins for the resin system. The urea-formaldehyde resin can be prepared from urea and formaldehyde monomers or from UF precondensates in manners known to those of skill in the art. For example, any of the wide variety of procedures used for reacting urea and formaldehyde monomers to form a UF resin can be used, such as staged monomer addition, staged catalyst addition, pH control, amine modification and the like. The urea and formaldehyde monomers can be reacted in an aqueous solution under alkaline conditions using known techniques and equipment.

Formaldehyde for making a suitable UF resin is available in many forms. Suitable formaldehyde compounds that can be used to make urea-formaldehyde resins can include those discussed and described above with reference to phenol-formaldehyde resins.

Other aldehyde monomers can be used in lieu of or in combination with formaldehyde for making resins. The aldehyde monomers can include any suitable aldehyde or combination of aldehydes. The aldehyde monomers can include a variety of substituted and unsubstituted aldehyde compounds. Illustrative aldehyde compounds can include the so-called masked aldehydes or aldehyde equivalents, such as acetals or hemiacetals. Specific examples of suitable aldehyde compounds can include, but are not limited to, formaldehyde, acetaldehyde, propionaldehyde, butyraldehyde, furfuraldehyde, benzaldehyde, or any combination thereof. As used herein, the term "formaldehyde" can refer to formaldehyde, formaldehyde derivatives, other aldehydes, or combinations thereof. Preferably, the aldehyde monomer can be formaldehyde.

As discussed above, urea is available in many forms that can be used to make a resin. Solid urea, such as prill, and urea solutions, such as aqueous solutions, can be used. Any form of urea or urea in combination with formaldehyde can be uses. Both urea prill and combined urea-formaldehyde products are preferred, such as Urea-Formaldehyde Concentrate or UFC 85. These types of products are disclosed in, for example, U.S. Pat. Nos. 5,362,842 and 5,389,716.

The urea-formaldehyde resin can be made using a molar excess of formaldehyde. When synthesized, such resins contain a low level of residual "free" urea and a much larger amount of residual "free," i.e., unreacted, formaldehyde. Prior to any formaldehyde scavenging, the urea-formaldehyde resin can be characterized by a free formaldehyde content from about 0.2 wt % to about 18 wt % of the aqueous urea-formaldehyde resin. For example, the phenol-formaldehyde resin can have a concentration of free formaldehyde from a low of about 0.1 wt %, about 0.5 wt %, about 1 wt %, or about 2 wt % to a high of about 6 wt %, about 12 wt %, or about 18 wt %, based on the total weight of the phenol-formaldehyde resin.

The urea-formaldehyde resin can have a molar ratio of formaldehyde to urea (F:U) from a low of about 0.3:1, about 0.9:1, or about 1.5:1 to a high of about 3:1, about 4:1, about 5:1, or about 6:1. For example, the urea-formaldehyde resin can have a molar ratio of formaldehyde to urea from about 0.5:1 to about 0.1.2:1, about 1.3:1 to about 2:1, about 2:1 to about 3:1, about 1.1:1 to about 3:1, about 4:1 to about 5:1, or about 5:1 to about 6:1. In other example, the urea-formaldehyde resin can have a molar ratio of formaldehyde to urea from about 0.7:1 to about 2.7:1, about 0.9:1 to about 1.3:1, about 1:1 to about 2.4:1, about 1.1:1 to about 2.6:1, or about 1.3:1 to about 2:1.

The urea-formaldehyde resin can have a weight average molecular weight from a low of about 200, about 300, or about 400 to a high of about 1,000, about 2,000, or about 6,000. In another example, the urea-formaldehyde resin can have a weight average molecular weight from about 250 to about 450, about 450 to about 550, about 550 to about 950, about 950 to about 1,500, about 1,500 to about 2,500, or about 2,500 to about 6,000. In another example, urea-formaldehyde resin can have a weight average molecular weight of about 175 to about 800, about 700 to about 3,330, about 1,100 to about 4,200, about 230 to about 550, about 425 to about 875, or about 475 to about 775.

The urea-formaldehyde resin can have a number average molecular weight from a low of about 200, about 300, or about 400 to a high of about 1,000, about 2,000, or about 6,000. In another example, the urea-formaldehyde resin can have a number average molecular weight from about 250 to about 450, about 450 to about 550, about 550 to about 950, about 950 to about 1,500, about 1,500 to about 2,500, or about 2,500 to about 6,000. In another example, the urea-formaldehyde resin can have a number average molecular weight of about 175 to about 800, about 700 to about 3,000, about 1,100 to about 2,200, about 230 to about 550, about 425 to about 875, or about 475 to about 775.

The urea-formaldehyde resin can have a z-average molecular weight from a low of about 200, about 300, or about 400 to a high of about 1,000, about 2,000, or about 9,000. In another example, the urea-formaldehyde resin can have a z-average molecular weight from about 250 to about 450, about 450 to about 550, about 550 to about 950, about 950 to about 1,500, about 1,500 to about 2,500, or about 2,500 to about 6,000. In another example, the urea-formaldehyde resin can have a z-average molecular weight of about 175 to about 800, about 700 to about 3,330, about 1,100 to about 4,200, about 230 to about 550, about 425 to about 875, or about 475 to about 775.

The urea-formaldehyde resin can have a polydispersity index from a low of about 1, about 1.75, or about 2.5 to a high of about 3.5, about 5, or about 7. In another example, the urea-formaldehyde resin can have a polydispersity index from about 1.00 to about 1.75, about 1.75 to about 2.5, about 2.5 to about 3.5, about 3.5 to about 4.5, about 4.5 to about 6, or about 6 to about 7. In another example, urea-formaldehyde resin can have a polydispersity index of about 1 to about 3.3, about 5.45 to about 6.9, about 2.25 to about 4.5, about 3 to about 4, about 1.75 to about 2.5, or about 3.35 to about 5.

The reaction can be conducted in an aqueous solution. The reaction can be conducted so that the resulting urea-formaldehyde resin has a solids content of at least about 20 wt %, at least about 30 wt %, at least about 35 wt %, or at least about 45 wt %, based on the weight of the UF resin solution. The solids content can range from a low of about 20 wt %, about 30 wt %, about 40 wt %, about 45 wt %, or about 50 wt % to a high of about 55 wt %, about 60 wt %, about 65 wt %, about 70 wt %, about 75 wt %, or about 80 wt %, based on the weight of the UF resin solution. For example, UF resin solutions can have a non-volatile material or solids content from about 40 wt % and about 48 wt %, about 40 wt % and about 44 wt %, about 45 wt % and about 65 wt %, or about 50 wt % and about 60 wt %, based on the weight of the UF resin solution.

The viscosity of the urea-formaldehyde resin can widely vary. For example, the viscosity of the urea-formaldehyde resin can range from a low of about 1 cP, about 100 cP, about 250 cP, about 500 cP, or about 700 cP to a high of about 1,000 cP, about 1,250 cP, about 1,500 cP, about 2,000 cP, or about 2,200 cP at a temperature of about 25° C. In another example, the urea-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the urea-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity can be determined using a Brookfield viscometer. For example, the Brookfield Viscometer can be equipped with a small sample adapter such a 10 mL adapter and the appropriate spindle to maximize torque such as a spindle no. 31.

The urea-formaldehyde resin can have pH from a low of about 1, about 2, about 3, about 4, about 5, about 6, about 7 to a high of about 8, about 9, about 10, about 11, about 12, or about 13. In another example, urea-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

The UF resin can also include additives such as ammonia, alkanolamines, or polyamines, such as an alkyl primary diamine, e.g., ethylenediamine (EDA). Other additives, such as melamine, ethylene ureas, and primary, secondary and tertiary amines, for example, dicyanodiamide, can also be incorporated into UF resins. Concentrations of these additives in the reaction mixture often will vary from about 0.05 to about 20.0% by weight of the UF resin solids. These types of additives can promote hydrolysis resistance, polymer flexibility and lower formaldehyde emissions in the cured resin. Further urea additions for purposes of scavenging formaldehyde or as a diluent also can be used. Urea-formaldehyde resins can also have a water dilutability of about 1:1 to about 100:1, preferably about 5:1 and above.

The additives can be other monomers and/or polymers such as styrene acrylic acid or styrene acrylate, an adduct of styrene, maleic anhydride, and an acrylic acid or acrylate, or a mixture of a styrene acrylic acid or styrene-acrylate copolymer and a styrene-maleic anhydride copolymer. The additive can be added to the UF resin or can be formed in situ by mixing the styrene-maleic anhydride and an acrylate monomer with the UF resin.

The additive can be prepared by combining styrene, maleic anhydride, and an acrylate or acrylic acid in amounts to form a terpolymer. The amount of styrene can be about 50% to about 85%, preferably about 70%. The amount of maleic anhydride can be about 15% to about 50%, preferably about 25%. The amount of an acrylate or acrylic acid can be about 1 to about 20%, preferably about 5%.

The constituents of the terpolymer can be dissolved in a suitable solution such as an aqueous solution of sodium hydroxide, ammonium hydroxide, potassium hydroxide, or combinations thereof. Preferably about 1-5% of the terpolymer constituents are dissolved in the aqueous solution. The solution can be heated from about 70° C. to about 90° C., and held until the terpolymer is in solution. The solution can then be added to a urea-formaldehyde resin.

Alternatively the acrylic acid or acrylate can be combined with styrene maleic anhydride in situ with the urea-formaldehyde resin. The result can be a styrene maleic anhydride methylmethacrylate terpolymer. Any suitable acrylic acid or acrylate can be used such as methyl methacrylate, butyl acrylate, or methacrylate. Preferably, the acrylate is methyl methacrylate (MMA). Styrene-maleic anhydride (SMA) copolymers can be used. Suitable SMA copolymers are described in U.S. Pat. No. 5,914,365.

The additive can make up about 0.1 wt % to about 10 wt %, preferably about 0.5 wt % to about 5 wt % of the undiluted resin solids. The total concentration of non-volatile materials in the aqueous resin composition (predominantly UF resin and additive solids) can vary widely. The total solids concentration can be about 5 wt % to about 40 wt %, based on the total weight of the resin composition. Preferably the total solids can be from about 20 wt % to about 35 wt %, more preferably from about 20 wt % to about 30 wt %.

Many urea-formaldehyde resins that can be used are commercially available. One particularly useful class of UF resins for use in preparing resin systems is disclosed in U.S. Pat. No. 5,362,842, the disclosure of which is incorporated herein by reference. Urea-formaldehyde resins such as the types sold by Georgia Pacific Chemicals LLC (e.g. GP® 2928 and GP® 2980) can be used.

In an embodiment, melamine-formaldehyde (MF) resins can be used as resins for the resin system. The melamine-formaldehyde resin can be produced via any suitable process. In preparing a melamine-formaldehyde resin, the formaldehyde and the melamine can be reacted in an aqueous mixture under alkaline conditions using known techniques and equipment. The melamine-formaldehyde resin can be made using a molar excess of formaldehyde (along with any other reactive aldehydes) relative to the melamine.

The alkaline condition for synthesizing the melamine-formaldehyde resin can be achieved simply by adding a base to an aqueous mixture to obtain the desired pH. Suitable bases include, but are not limited to, alkali metal hydroxides, such as sodium, lithium, or potassium hydroxide. Other bases include alkali metal carbonates, such as sodium carbonate and potassium carbonate, alkaline earth hydroxides, such as magnesium hydroxide, calcium hydroxide and barium hydroxide, aqueous ammonia, and amines, such as triethanolamine. Preferably caustic soda (sodium hydroxide) can be used.

Similar to urea-formaldehyde resins and phenol-formaldehyde resins, melamine-formaldehyde resins can be prepared from melamine monomers and formaldehyde monomers or from melamine-formaldehyde precondensates. Melamine reactants are commercially available in many forms and any form that can react with the other reactants and does not introduce extraneous moieties deleterious to the desired reaction and reaction product can be used in the preparation of the resins.

The melamine can be partially or totally replaced with other suitable amine-containing compounds. Other suitable compounds can include, but are not limited to, urea, thiourea, dicyandiamide, melem, melam, melon, ammeline, ammelide, substituted melamines, guanamines, or mixtures thereof. Substituted melamines can include the alkyl melamines and aryl melamines which can be mono-, di-, or tri-substituted. In the alkyl-substituted melamines, each alkyl group can contain from 1 to 6 carbons, preferably from 1 to 4 carbons. Representative examples of some alkyl-substituted melamines can include, but are not limited to, monomethylmelamine, dimethyl melamine, trimethyl melamine, monoethyl melamine, and 1-methyl-3-propyl-5-butyl melamine. In the aryl-substituted melamines, each aryl group can contain 1-2 phenyl moieties and, preferably, 1 phenyl moiety. Typical examples of an aryl-substituted melamine are monophenyl melamine or diphenyl melamine. Based on considerations of cost and availability, standard melamine is preferred.

The guanamines can be of any of the cycloaliphatic guanamines. Preferably, the cycloaliphatic guanamines can include about 15 carbon atoms or less. Typical examples of some cycloaliphatic guanamines are tetrahydrobenzoguanamine, hexahydrobenzoguanamine, 3-methyl-tetrahydrobenzoguanamine, 3-methyl-hexahydrobenzoguanamine, 3,4-dimethyl-1,2,5,6-tetrahydrobenzoguanamine, and 3,4-dimethylhexahydrobenzoguanamine and mixtures thereof. A preferred cycloaliphatic guanamine is tetrahydrobenzoguanamine. Other guanamines which might be used include acetoguanamine, formoguanamine, or benzoguanamine. Mixtures of aminotriazine compounds also are contemplated such as a mixture of melamine and an alkyl substituted melamine and a cycloaliphatic guanamine, such as tetrahydrobenzoguanamine.

Formaldehyde can be used alone or in combination with a variety of other aldehydes or their equivalents heretofore employed in the formation of melamine resins. Aldehydes, other than formaldehyde that can be used, can include, but are not limited to, acetaldehyde, propionaldehyde, butylaldehyde, furfuraldehyde, benzaldehyde, acrolein, methacrolein, crotonaldehyde, or any combination thereof. The aldehydes can have the formula R'CHO, wherein R' a hydrogen or hydrocarbon moiety containing from 1 to 8 carbon atoms. Formaldehyde is preferred in most applications. Formaldehyde can be supplied in any one of its commonly available forms, including formalin solutions and paraformaldehyde. Formaldehyde can be used as an aqueous formalin solution at a concentration of 30-50% by weight.

The melamine-formaldehyde resin can have a molar ratio of formaldehyde to melamine (F:M) from a low of about 0.3:1, about 1:1, or about 2:1 to a high of about 3:1, about 4, about 5:1, or about 6:1. For example, the melamine-formaldehyde resin can have a molar ratio of formaldehyde to melamine from about 0.7:1 to about 2.7:1, about 0.8:1 to about 2.5:1, about 1:1 to about 2.4:1, about 1.1:1 to about 2.6:1, or about 1.3:1 to about 1.8:1. In other example, the melamine-formaldehyde resin can have a molar ratio of formaldehyde to melamine from about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

The melamine-formaldehyde resin can have a weight average molecular weight from a low of about 200, about 300, or about 400 to a high of about 1,000, about 2,000, or about 6,000. In another example, the melamine-formaldehyde resin can have a weight average molecular weight from about 250 to about 450, about 450 to about 550, about 550 to about 950, about 950 to about 1,500, about 1,500 to about 2,500, or about 2,500 to about 6,000. In another example, melamine-formaldehyde resin can have a weight average molecular weight of about 175 to about 800, about 700 to about 3,330, about 1,100 to about 4,200, about 230 to about 550, about 425 to about 875, or about 475 to about 775.

The melamine-formaldehyde resin can have a number average molecular weight from a low of about 200, about 300, or about 400 to a high of about 1,000, about 2,000, or about 6,000. In another example, the melamine-formaldehyde resin can have a number average molecular weight from about 250 to about 450, about 450 to about 550, about 550 to about 950, about 950 to about 1,500, about 1,500 to about 2,500, or about 2,500 to about 6,000. In another example, the melamine-formaldehyde resin can have a number average molecular weight of about 175 to about 800, about 700 to about 3,000, about 1,100 to about 2,200, about 230 to about 550, about 425 to about 875, or about 1,475 to about 7,750.

The melamine-formaldehyde resin can have a z-average molecular weight from a low of about 200, about 300, or about 400 to a high of about 1,000, about 2,000, or about 9,000. In another example, the melamine-formaldehyde resin can have a z-average molecular weight from about 250 to about 450, about 450 to about 550, about 550 to about 950, about 950 to about 1,500, about 1,500 to about 2,500, or about 2,500 to about 9,000. In another example, the melamine-formaldehyde resin can have a z-average molecular weight of about 175 to about 800, about 700 to about 3,330, about 1,100 to about 4,200, about 230 to about 550, about 425 to about 875, or about 1,475 to about 7,750.

The melamine-formaldehyde resin can have a polydispersity index from a low of about 1.00, about 1.75, or about 2.5 to a high of about 3.5, about 5, or about 7. In another example, the melamine-formaldehyde resin can have a polydispersity index from about 1 to about 1.75, about 1.75 to about 2.5, about 2.5 to about 3.5, about 3.5 to about 4.5, about 4.5 to about 6, or about 6 to about 7. In another example, melamine-formaldehyde resin can have a polydispersity index of about 1 to about 2.25, about 1.75 to about 3.25, about 2.5 to about 3.5, about 5.25 to about 7, about 4.25 to about 6.5, or about 5 to about 6.25.

When synthesized, such resins can contain a low level of residual or "free" melamine and a much larger amount of residual or "free," i.e. unreacted formaldehyde. Prior to any formaldehyde scavenging, the melamine-formaldehyde resin can be characterized by a free formaldehyde content from about 0.2 wt % to about 18 wt % of the aqueous melamine-formaldehyde resin.

The reaction can be conducted so that the resulting melamine-formaldehyde resin has a solids content of at least about 20 wt %, at least about 30 wt %, at least about 35 wt %, or at least about 45 wt %, based on the weight of the melamine-formaldehyde resin solution. The solids content can range from a low of about 20 wt %, about 30 wt %, about 40 wt %, about 45 wt %, or about 50 wt % to a high of about 55 wt %, about 60 wt %, about 65 wt %, about 70 wt %, about 75 wt %, or about 80 wt %, based on the weight of the melamine-formaldehyde resin solution. For example, melamine-formaldehyde resin can have a solids content from about 40 wt % and about 48 wt %, about 40 wt % and about 44 wt %, about 45 wt % and about 65 wt %, or about 50 wt % and about 60 wt %, based on the weight of the melamine-formaldehyde resin solution.

The viscosity of the melamine-formaldehyde resin can widely vary. For example, the viscosity of the melamine-formaldehyde resin can range from a low of about 1 cP, about 100 cP, about 250 cP, about 500 cP, or about 700 cP to a high of about 1,000 cP, about 1,250 cP, about 1,500 cP, about 2,000 cP, or about 2,200 cP at a temperature of about 25° C. In another example, the melamine-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the melamine-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity can be determined using a Brookfield viscometer. For example, the Brookfield Viscometer can be equipped with a small sample adapter such a 10 mL adapter and the appropriate spindle to maximize torque such as a spindle no. 31.

The melamine-formaldehyde resin can have pH from a low of about 1, about 2, about 3, about 4, about 5, about 6, about 7 to a high of about 8, about 9, about 10, about 11, about 12, or about 13. In another example, melamine-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

Additives can be added to the melamine-formaldehyde resins. For example, alkylene glycols can be added. These include, but are not limited to, ethylene glycol, diethylene glycol, and propylene glycol. The alkylene glycol can be added in amount of about 1-10 wt %, preferably about 1 to about 3 wt % based on the total weight of the resin solids after polymerization. Other additives include sorbitol and dicyandiamide which can be added in amount of about 1 wt % to about 10 wt %, preferably about 3 wt % to about 5 wt %.

Many melamine-formaldehyde resins that can be used are commercially available. Suitable melamine-formaldehyde resins can include those sold by Georgia Pacific Chemicals LLC (e.g. GP® 4878). In an embodiment, a melamine-urea-formaldehyde (MUF) resin can be used as a resin for the resin system. The melamine-urea-formaldehyde resin can be produced via any suitable process.

The MUF resin can be prepared by reacting formaldehyde with urea and then with melamine under controlled molar ratios and reaction conditions. In one specific embodiment, the melamine-urea-formaldehyde resin can be prepared according to the following steps: (a) an aqueous mixture of formaldehyde and urea can be reacted at an F:U mole ratio of about 1.6 to about 2.8, preferably about 2.1, under an alkaline condition; (b) thereafter, a sufficient amount of a mild acid can be added to reduce the pH of the mixture to about 5.0 to about 5.7, preferably about 5.4 to about 5.6, and the mixture can be reacted further; (c) the mixture then can be neutralized to a pH between about 6.5 and about 6.9; (d) thereafter, additional formaldehyde can be added to the mixture, and then melamine in an amount of about 2 wt % to about 10 wt %, preferably about 2 wt % to about 6 wt %, based on the total mixture weight, can be added to the mixture, to achieve a cumulative F:(U+M) molar ratio of about 1.9 to about 2.6, preferably about 2.1 to about 2.5, and, most preferably about 2.4, and the reaction can be continued at a pH about 6.2 to about 6.9, preferably about 6.5 to about 6.9; (e) additional melamine can be added to the mixture to achieve a cumulative F:(U+M) mole ratio of about 1.7 to about 2.4; (f) the pH of the mixture can be adjusted to about 7.6 to 8.0; (g) sufficient urea can be added to produce a final mole ratio of F:(U+M) of about 0.5 to 1.1, preferably about 0.5 to about 0.8, and, most preferably, about 0.65. The melamine and urea molar ratio can be calculated based on the number of active nitrogen sites in each compound. The temperature can be maintained between about 70° C. and 100° C. during each step of the reaction in order to advance the resin.

An alkaline condition can be established and maintained in step (a) by adding a base which promotes the desired reaction and provides the proper pH conditions. Typical bases include, but are not limited to triethanolamine, alkali metal hydroxides such as sodium, lithium or potassium hydroxide, preferably sodium hydroxide, or other alkaline compounds such as alkali metal carbonates, alkaline earth hydroxides, organic amines. Preferably, triethanolamine can be used to establish the initial alkaline condition and sodium hydroxide can be added to maintain the alkalinity, as needed. The pH can be above about 6.7 and preferably can be between about 7 and about 7.9.

Following this first step, a sufficient amount of a mild acid can be added to adjust the pH to permit control over the rate of condensation with a preferred pH being about 5.0 to about 6.5, preferably about 5.4 to about 5.6. Mild acids include dilute mineral acids, organic acids or acid salts, such as ammonium chloride, ammonium sulfate, or alum that are diluted to a controlled concentration. Usually about 15 to about 25 wt % solution of the acid in water. Preferred mild acids include about 20 wt % solutions of either formic acid or ammonium sulfate. The amount of mild acid required to adjust the pH depends, at least in part, on various conditions within the reaction mixture and the particular mild acid used, and can easily be determined.

The acidic reaction medium can be neutralized with any appropriate base known in the art, such as an alkali metal hydroxide, alkali metal carbonates, alkaline earth hydroxides, or organic amines, as described above. Preferably, the mixture can be neutralized with triethanolamine or sodium hydroxide.

The pH of the reaction mixture in steps (c) and (d) can also be established by adding an alkaline agent as described above. Preferably, sodium hydroxide can be used to maintain the pH at this step.

The alkaline pH of the reaction mixture in step (f) can be preferably established using a suitable amount of triethanolamine, although any other alkaline agent or mixtures of alkaline agents can be used to adjust the alkalinity of the reaction mixture such as those used in (a).

The amount of time sufficient for the reaction to proceed to the desired extent at each step varies, depending, at least in part, on the particular reaction conditions including pH and temperature. It is within the skill of the practitioner to vary the conditions to obtain a particular result. The total reaction time for the synthesis of the melamine-urea-formaldehyde resin can be carried out for a time from a low of about 1 minute, about 10 minutes, or about 30 minutes to a high of about 8 hours, about 10 hours, or about 20 hours. For example, synthesis of the melamine-urea-formaldehyde resin can be carried out for a time from about 10 minutes to about 240 minutes, about 20 minutes to about 180 minutes, about 10 minutes to about 1 hour, about 1 hour to about 7 hours, or about 2 hours to about 20 hours. The reactions can proceed to any suitable end point at each step, which can be determined by measuring the refractive index of the reaction mixture or by measuring the viscosity of the reaction mixture of by some combination thereof as recognized by those skilled in the art.

Skilled practitioners recognize that the reactants are commercially available in many forms. Any form which can react with the other reactants and which does not introduce extraneous moieties deleterious to the desired reaction and reaction product can also be used in the preparation of the melamine-urea-formaldehyde resin.

Formaldehyde is available in many forms, any of which can be used. Suitable formaldehyde compounds that can be used to make melamine-urea-formaldehyde resin can include those discussed and described above with reference to phenol-formaldehyde resins.

Similarly, urea is available in many forms, any of which can be used. Suitable urea compounds that can be used to make melamine-urea-formaldehyde resin can include those discussed and described above with reference to urea-formaldehyde resins.

Although melamine is specifically mentioned, the melamine can be totally or partially replaced with other aminotriazine compounds. Other suitable aminotriazine compounds include substituted melamines, or cycloaliphatic guanamines, or mixtures thereof. Substituted melamines include the alkyl melamines and aryl melamines which can be mono-, di-, or tri-substituted. In the alkyl substituted melamines, each alkyl group can contain 1-6 carbon atoms and, preferably, 1-4 carbon atoms. Examples of some of the alkyl-substituted melamines are monomethyl melamine, dimethyl melamine, trimethyl melamine, monoethyl melamine, and 1-methyl-3-propyl-5-butyl melamine. In the aryl-substituted melamines, each aryl group can contain 1-2 phenyl radicals and, preferably, 1 phenyl radical. Typical examples of an aryl-substituted melamine are monophenyl melamine and diphenyl melamine.

Any of the cycloaliphatic guanamines can be used. Preferably, the cycloaliphatic guanamines should not have more than 15 carbon atoms. Typical examples of some of the cycloaliphatic guanamines are tetrahydrobenzoguanamine, hexahydrobenzoguanamine, 3-methyl-tetrahydrobenzoguanamine, 3-methylhexahydrobenzoguanamine, 3,4-dimethyl-1,2,5,6-tetrahydrobenzoguanamine, and 3,4-dimethyl-hexahydrobenzoguanamine and mixtures thereof. A preferred cycloaliphatic guanamine is tetrahydrobenzoguanamine Mixtures of aminotriazine compounds include melamine and an alkyl-substituted melamine, such as dimethyl melamine, or melamine and a cycloaliphatic guanamine, such as tetrahydrobenzoguanamine.

The melamine-urea-formaldehyde resin can have an amount of free formaldehyde of about 0.1 wt % and about 6 wt %. For example, the melamine-urea-formaldehyde resin can have a concentration of free formaldehyde from a low of about 0.1 wt %, about 0.5 wt %, about 1 wt %, or about 2 wt % to a high of about 3 wt %, about 5 wt %, or about 6 wt %, based on the total weight of melamine-urea-formaldehyde resin.

The melamine-urea-formaldehyde resin can have a molar ratio of formaldehyde to the sum of moles for urea and melamine F:(U+M) from a low of about 0.3:1, about 0.5:1, or about 1:1 to a high of about 2:1, about 4:1, or about 5:1. For example, the melamine-urea-formaldehyde resin can have a molar ratio of formaldehyde to the sum of moles for urea and melamine from about 0.3:1 to about 5:1, about 0.5:1 to about 7:1, about 0.8:1 to about 1:1, about 1.2:1 to about 1.2:1, about 1.2:1 to about 1.6:1, about 1.5:1 to about 2:1, about 2:1 to about 2.5:1, about 2.5:1 to about 3:1, or about 3:1 to about 4:1.

The melamine-urea-formaldehyde resin can have a weight average molecular weight from a low of about 200, about 300, or about 400 to a high of about 1,000, about 2,000, or about 6,000. In another example, the melamine-urea-formaldehyde resin can have a weight average molecular weight from about 250 to about 450, about 450 to about 550, about 550 to about 950, about 950 to about 1,500, about 1,500 to about 2,500, about 2,500 to about 3,000, or about 3,000 to about 3,500. In another example, melamine-urea-formaldehyde resin can have a weight average molecular weight of about 175 to about 800, about 700 to about 3,600, about 2,100 to about 4,200, about 230 to about 550, about 425 to about 875, or about 1,475 to about 5,775.

The melamine-urea-formaldehyde resin can have a number average molecular weight from a low of about 200, about 300, or about 400 to a high of about 1,000, about 3,000, or about 6,000. In another example, the melamine-urea-formaldehyde resin can have a number average molecular weight from about 250 to about 450, about 450 to about 550, about 550 to about 950, about 950 to about 1,500, about 1,500 to about 2,500, or about 2,500 to about 6,000. In another example, the melamine-urea-formaldehyde resin can have a number average molecular weight of about 175 to about 800, about 700 to about 2,900, about 1,100 to about 3,000, about 230 to about 550, about 425 to about 875, or about 700 to about 1,200.

The melamine-urea-formaldehyde resin can have a z-average molecular weight from a low of about 200, about 900, or about 1,000 to a high of about 4,000, about 6,000, or about 9,000. In another example, the melamine-urea-formaldehyde resin can have a z-average molecular weight from about 800 to about 1,000, about 1,000 to about 2,000, about 2,000 to about 4000, about 4,000 to about 6,000, about 6,000 to about 7,000, or about 7,000 to about 9,000. In another example, the melamine-urea-formaldehyde resin can have a z-average molecular weight of about 850 to about 2,000, about 1,500 to about 3,330, about 3,800 to about 5,200, about 5,100 to about 6,500, about 4,000 to about 8,000, or about 7,000 to about 8,000.

The melamine-urea-formaldehyde resin can have a polydispersity index from a low of about 1, about 1.75, or about 2.5 to a high of about 3.5, about 5, or about 7.5. In another example, the melamine-urea-formaldehyde resin can have a polydispersity index from about 1 to about 1.75, about 1.75 to about 2.5, about 2.5 to about 3.5, about 3.5 to about 5, about 5 to about 6, or about 6 to about 7. In another example, melamine-urea-formaldehyde resin can have a polydispersity index of about 1 to about 1.5, about 2.5 to about 4, about 1.75 to about 3.25, about 4.5 to about 6.5, about 2 to about 5, or about 4.25 to about 7.

The reaction can be conducted so that the resulting melamine-urea-formaldehyde resin has a solids content of at least about 20 wt %, at least about 30 wt %, at least about 35 wt %, or at least about 45 wt %, based on the weight of the melamine-urea-formaldehyde resin solution. The solids content can range from a low of about 20 wt %, about 30 wt %, about 40 wt %, about 45 wt %, or about 50 wt % to a high of about 55 wt %, about 60 wt %, about 65 wt %, about 70 wt %, about 75 wt %, or about 80 wt %, based on the weight of the melamine-urea-formaldehyde resin solution. For example, melamine-urea-formaldehyde resin can have a solids content from about 40 wt % and about 48 wt %, about 40 wt % and about 44 wt %, about 45 wt % and about 65 wt %, or about 50 wt % and about 60 wt %, based on the weight of the melamine-urea-formaldehyde resin solution.

The viscosity of the melamine-urea-formaldehyde resin can widely vary. For example, the viscosity of the melamine-urea-formaldehyde resin can range from a low of about 1 cP, about 100 cP, about 250 cP, about 500 cP, or about 700 cP to a high of about 1,000 cP, about 1,250 cP, about 1,500 cP, about 2,000 cP, or about 2,200 cP at a temperature of about 25° C. In another example, the melamine-urea-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the melamine-urea-formaldehyde resin can have a viscosity from about 1 cP to about 45 cP, about 45 cP to about 125, about 250 cP to about 650 cP, about 550 cP to about 825 cP, about 825 cP to about 1,100 cP, about 1,100 cP to about 1,600 cP, or about 1,600 cP to about 2,200 cP at a temperature of about 25° C. The viscosity can be determined using a Brookfield viscometer. For example, the Brookfield Viscometer can be equipped with a small sample adapter such a 10 mL adapter and the appropriate spindle to maximize torque such as a spindle no. 31.

The reactants can also include additives such as ethylenediamine (EDA). Other additives, such as ethylene ureas, and primary, secondary and tertiary amines, for example, dicyandiamide can also be incorporated into the resin. Concentrations of these additives in the reaction mixture can vary from about 0.05 to about 5 wt %.

The resin systems can be used as adhesives for bonding lignocellulose materials to make composite products. Illustrative lignocellulose composite products produced using the resin systems discussed and described herein can include, but are not limited to, particle board, fiberboard such as medium density fiberboard (MDF) and/or high density fiberboard (HDF), plywood such as hardwood plywood and/or softwood plywood, oriented strand board (OSB), laminated veneer lumber (LVL), laminated veneer boards (LVB), and the like. The resin systems can be used for making plywood adhesives used to bond veneers of relatively high average moisture content.

The production of lignocellulose containing products can include contacting a plurality of lignocellulose substrates with the resin system. The lignocellulose substrates can be contacted with the resin system by spraying, coating, mixing, brushing, falling film or curtain coater, dipping, soaking, or the like. After contacting the plurality of lignocellulose substrates with the resin system, the resin system can be at least partially cured. At least partially curing the resin system can include applying heat and/or pressure thereto. The resin system can also at least partially cure at room temperature and pressure. The lignocellulose substrates contacted with the resin system can be formed into a desired shape, e.g., a board, a woven mat, or a non-woven mat. The substrates contacted with the resin system can be formed into a desired shape before, during, and/or after partial curing of the resin system. Depending, at least in part, on the particular product, the substrates contacted with the resin system can be pressed before, during, and/or after the resin system at least partially cures. For example, the substrates contacted with the resin system can be consolidated or otherwise formed into a desired shape, if desired pressed to a particular density and thickness, and heated to at least partially cure the resin system. In another example, a blended furnish, i.e., a mixture of the substrates and the resin system, can be extruded through a die (extrusion process) and heated to at least partially cure the resin system.

A catalyst or cure accelerator can be added to the resin system in order to aid in the curing process. Suitable catalysts can include, but are not limited to, inorganic acids, organic acids (and anhydrides thereof), or any combination thereof. Illustrative inorganic acids can include, but are not limited to, sulfuric acid, hydrochloric acid, phosphoric acid, boric acid, or any combination thereof. Illustrative organic acids and anhydrides can include, but are not limited to, acetic acid, tartaric acid, benzoic acid, propionic acid, adipic acid, oxalic acid, fumaric acid, hexachloric phthalic anhydride, maleic anhydride, or any combination thereof. Other catalysts which can be employed can include compounds that can liberate an acid when heated. Such catalysts can include the amine salts of organic and inorganic acids, such as ethylene sulfite, the hydrochloric acid salt of 2-amino-2-methyl propanol, the hydrochloric acid salt of mono-, di-, or triethanol amine, the hydrochloric acid salt of 2-dimethylamino-2-methyl propanol, the amine salts of para-toluene sulfonic acid, the chloroacetic acid salt of pyridine, the triammonium acid pyrophosphate salt of aminomethyl propanol, and the phosphoric acid salt of 2-dimethylamino-2-methyl propanol. Other catalysts include the inorganic salts of inorganic acids, such as ammonium chloride, magnesium chloride, zinc chloride, or any combination thereof. The catalyst system can also include mixtures of the aforementioned catalysts.

Catalysts are added in an amount from about 0.1 wt % to 10 wt %, preferably about 0.1 wt % to 1.5 wt % and, most preferably, about 0.2 wt %, based on the resin solids. The catalyst can be added into the reaction vessel upon conclusion of the resin synthesis or to the resin system immediately prior to preparation of a laminate.

As used herein, the terms "curing," "cured," and similar terms are intended to embrace the structural and/or morphological change that occurs in a the resin system, such as by covalent chemical reaction (crosslinking), ionic interaction or clustering, improved adhesion to the substrate, phase transformation or inversion, and/or hydrogen bonding when the resin system can be at least partially cured to cause the properties of a flexible, porous substrate, such as a wood or other lignocellulose containing substrate, to which an effective amount of the resin system has been applied, to be altered.

The resin system can be applied to the mating surface of one or more veneer or wood plys. The resin system can be applied to the wood using conventional equipment, including spray nozzles, atomizing wheels, roll coaters, curtain coaters, foam applicators and the like. The amount of resin system can depend, at least in part, on the characteristics of the veneer to be bonded and the properties desired in the consolidated panel. The resin system can be applied to the veneer in an amount of between about 40 to about 130 and more preferably in an amount of about 60 to 120 pounds per 1,000 square feet of double glue line. The particular application rate or amount can differ with different wood sources. For example southern pine which has a higher absorbency capacity than western veneers such as Douglas Fir, requires greater adhesive spreads.

The various veneer plys can be assembled into a panel and consolidated at an ambient temperature, e.g., at a temperature of from about 15° C. to 30° C., and at a pressure sufficient to assemble the plys into a coherent article. The plys can be subjected to such pressure until a sufficient initial pre-pressed bond can be obtained to keep the plys from separating or coming apart upon release of the pressure. Pressure from about 172 kPa to about 2,758 kPa can be used. A bond of the required strength can be obtained with a contact time in the range of about 30 seconds to 20 minutes.

After this initial consolidation, the pressure on the panels can be released and they are stored until they are consolidated at an elevated temperature at which the resin system cures. For the final press, the panels can be consolidated at a temperature within the range of about 90° C. to 200° C. and at pressures of about 517 kPa to about 1,724 kPa. The panels are subjected to these press conditions for a time sufficient to cure the adhesive, which can be from about 1 minute to about 20 minutes.

The resin systems can be used for gluing high average moisture content veneers with reduced blowouts and other moisture induced defects. By using a resin system, plywood can be prepared from a plurality of veneers having an average moisture content of greater than about 7% and up to about 12% and higher, with spots of moisture as high as 15-20%, based on the dry weight of the veneer. For example, the veneer can have an average moisture content from a low of about 3 wt %, about 5 wt %, about 7 wt %, about 9 wt %, about 11 wt %, or about 13 wt % to a high of about 17 wt %, about 20 wt %, about 22 wt %, or about 25 wt %, based on the dry weight of the veneer.

The lignocellulose substrates (material that includes both cellulose and lignin) can include, but is not limited to, straw, hemp, sisal, cotton stalk, wheat, bamboo, sabai grass, rice straw, banana leaves, paper mulberry (i.e., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particle board, animal fibers (e.g., wool, hair), recycled paper products (e.g., newspapers, cardboard, cereal boxes, and magazines), or any combination thereof. Suitable woods can include softwoods and/or hardwoods. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow.

The starting material, from which the lignocellulose substrates can be derived from, can also be formed into the appropriate size or dimensions by skiving, cutting, slicing, sawing, or otherwise removing a thin layer or sheet from a source of lignocellulose material, e.g., a wood log, to produce a veneer substrate or layer. One or more composite products can be produced from two or more veneer. For example, composite products produced with veneer shaped substrates, in finished form, can include those products referred to as laminated veneer lumber (LVL), laminated veneer boards (LVB), and/or plywood.

The starting material, from which the lignocellulose substrates can be derived from, can be reduced to the appropriate size or dimensions by various processes such as hogging, grinding, hammer milling, tearing, shredding, and/or flaking. Suitable forms of the lignocellulose substrates can include, but are not limited to, chips, fibers, shavings, sawdust or dust, or the like. The lignocellulose substrates can have a length from a low of about 0.05 mm, about 0.1 mm, about 0.2 mm to a high of about 1 mm, about 5 mm, about 10 mm, about 20 mm, about 30 mm, about 40 mm, about 50 mm, or about 100 mm.

Depending, at least in part, on the particular veneer product that can incorporate the veneer(s), the veneers can have any suitable shape, e.g., rectangular, circular, or any other geometrical shape. The veneers can be rectangular, and can have a width from a low of about 1 cm, about 5 cm, about 10 cm, about 15 cm, about 20 cm, or about 25 cm to a high of about 0.6 m, about 0.9 m, about 1.2 m, about 1.8 m, or about 2.4 m. The veneers can have a length from a low of about 0.3 m, about 0.6 m, about 0.9 m, about 1.2 m, or about 1.8 m to a high of about 2.4 m, or about 3 m, about 3.6 m, about 4.3 m, about 4.9 m, about 5.5 m, about 6.1 m, about 6.7 m, about 7.3 m, or about 7.9 m. For example, in a typical veneer product such as plywood, the veneers can have a width of about 1.2 m and a length of about 2.4 m. The veneers can have a thickness from a low of about 0.8 mm, about 0.9 mm, about 1 mm, about 1.1 mm or about 1.2 mm to a high of about 3 mm, about 4 mm, about 5 mm, about 6 mm, about 7 mm, about 8 mm, about 9 mm, or about 10 mm.

Illustrative composite wood products or articles produced using the resin system discussed and described herein can include, but are not limited to, particle board, fiberboard such as medium density fiberboard (MDF) and/or high density fiberboard (HDF), plywood such as hardwood plywood and/or softwood plywood, oriented strand board (OSB), laminated veneer lumber (LVL), laminated veneer boards (LVB), and the like.

The resin system can be applied to the plurality of substrates immediately after preparation of the resin system or within about 1 minute, about 5 minutes, about 10 minutes, about 30 minutes, about 1 hour, about 2 hours, about 4 hours, about 12 hours, about 24 hours, about 3 months, about 6 months, or about 1 year after preparation of the resin system. For example, application of the resin system to the substrates can be carried out in less than about 1 year, less than about 6 months, less than about 1 month, less than about 24 hour, less than about 12 hours, less than about 1 hour, less than about 15 minutes, or less than about 1 minute after combining the first and second resins to produce the resin system.

The amount of the resin system applied to the lignocellulose substrates can range from a low of about 3 wt %, about 4 wt %, about 5 wt % or about 6 wt % to a high of about 10 wt %, about 12 wt %, about 15 wt %, or about 20 wt %, based on a weight of the wood based or wood containing material. For example, a lignocellulose composite product can contain from about 5 wt % to about 15 wt %, about 8 wt % to about 14 wt %, about 10 wt % to about 12 wt %, or about 7 wt % to about 10 wt % resin system, based on a dry weight of the lignocellulose substrates.

The pressure applied in producing the product can depend, at least in part, on the particular product. For example, the amount of pressure applied to a particle board process can range from about 1 MPa to about 5 MPa or from about 2 MPa to about 4 MPa. In another example, the amount of pressure applied to a MDF product can range from about 2 MPa to about 7 MPa or from about 3 MPa to about 6 MPa. The temperature the product can be heated to produce an at least partially cured product can range from a low of about 100° C., about 125° C., about 150° C., or about 170° C. to a high of about 180° C., about 200° C., about 220° C., or about 250° C. The length of time the pressure can be applied can range from a low of about 30 seconds, about 1 minute, about 3 minutes, about 5 minutes, or about 7 minutes to a high of about 10 minutes, about 15 minutes, about 20 minutes, or about 30 minutes, which can depend, at least in part, on the particular product and/or the particular dimensions, e.g., thickness of the product.

EXAMPLES

In order to provide a better understanding of the foregoing discussion, the following non-limiting examples are offered. Although the examples can be directed to specific embodiments, they are not to be viewed as limiting the invention in any specific respect. All parts, proportions, and percentages are by weight unless otherwise indicated.

Resin systems were compared to straight cooked resins with similar molar ratios of polymerized monomers. Example 1 (Ex. 1) was prepared by blending a first phenolformaldehyde resin having a molar ratio (MR) of formaldehyde to phenol (F:P) of 2.0:1 and a second phenol formaldehyde resin having a molar ratio of formaldehyde to phenol of 2.3:1 to provide a resin system that had a composite molar ratio (CMR) of formaldehyde to phenol of 2.1:1. Example 2 (Ex. 2) was prepared by blending a first phenol formaldehyde resin having a molar ratio of formaldehyde to phenol of 2.0:1 and a second phenol formaldehyde resin having a molar ratio of formaldehyde to phenol of 2.3:1 to provide a resin system that had a composite molar ratio of 2.2:1. Comparative examples 1 and 2 (C1 and C2) were straight cooked phenolformaldehyde resins that had molar ratios of formaldehyde to phenol of 2.1:1 and 2.2:1, respectively.

The first PF resin having the F:P molar ratio of 2.0 was prepared by charging 1,325.5 g of phenol, 676.8 g of formaldehyde, 1,381.4 g of water, and 1.3 g of defoamer to the reaction vessel. The reactants were stirred. 285.0 g of NaOH was added to the reaction mixture. The reaction exothermed to a temperature of 80° C. An additional 1,015.1 g of formaldehyde was added to the reaction vessel. The reaction exothermed to a temperature of 96° C. The reaction mixture was stirred for 60 minutes. An additional 315.0 g of NaOH was then added to the reaction mixture. The mixture was stirred for 40 minutes with the reaction temperature cooling to less than 70° C. The first PF resin had the following properties: 43.0 wt % solids, pH of 11.5, alkalinity of 6.0%, a weight average molecular weight of 3,745, a number average molecular weight of 848, a z-average molecular weight of 8,068, a polydispersity index of 4.42, and a viscosity of 840 cP at 25°, as measured on a Brookfield viscometer.

The second PF resin having the F:P molar ratio of 2.3 was prepared by charging 1,271.5 g of phenol, 649.2 g of formaldehyde, 1,261.0 g of water, and 1.3 g of defoamer to the reaction vessel. The reactants were stirred. 285.0 g of NaOH was added to the reaction mixture. The reaction exothermed to a temperature of 80° C. An additional 1,217.2 g of formaldehyde was added to the reaction vessel. The reaction exothermed to a temperature of 96° C. The reaction mixture was stirred for 60 minutes. An additional 315.0 g of NaOH was then added to the reaction mixture. The mixture was stirred for 30 minutes with the reaction temperature cooling to less than 70° C. The second PF resin had the following properties: 43.4 wt % solids, pH of 11.5, alkalinity of 6.0%, a weight average molecular weight of 3,404, a number average molecular weight of 948, a z-average molecular weight of 6,336, a polydispersity index of 3.59, and a viscosity of 750 cP at 25° C., as measured on a Brookfield viscometer.

The resin of Example 1 had the following properties: 43.3 wt % solids, pH of 11.5, alkalinity of 6.0%, and a viscosity of 815 cP at 25° C., as measured on a Brookfield viscometer. The resin of Example 2 had the following properties: 43.3 wt % solids, pH of 11.5, alkalinity of 6.0%, a weight average molecular weight of 3,891, a number average molecular weight of 1,126, a z-average molecular weight of 7,361, a polydispersity index of 3.46, and a viscosity of 765 cP at 25° C., as measured on a Brookfield viscometer.

Comparative resin 1 (C1) having the F:P molar ratio of 2.1 was prepared by charging 1,307.0 g of phenol, 667.3 g of formaldehyde, 1,340.1 g of water, and 1.3 g of defoamer to the reaction vessel. The reactants were stirred. 285.0 g of NaOH was added to the reaction mixture. The reaction exothermed to a temperature of 80° C. An additional 1,084.4 g of formaldehyde was added to the reaction vessel. The reaction exothermed to a temperature of 96° C. The reaction mixture was stirred for 75 minutes. An additional 315.0 g of NaOH was then added to the reaction mixture. The mixture was stirred for 60 minutes with the reaction temperature cooling to less than 70° C. The comparative resin C1 had the following properties: 43.0 wt % solids, pH of 11.6, alkalinity of 6.0%, and a viscosity of 805 cP at 25° C., as measured on a Brookfield viscometer.

Comparative resin 2 (C2) having the F:P molar ratio of 2.2 was prepared by charging 1,289.0 g of phenol, 658.1 g of formaldehyde, 1,300.0 g of water, and 1.3 g of defoamer to the reaction vessel. The reactants were stirred. 285.0 g of NaOH was added to the reaction mixture. The reaction exothermed to a temperature of 80° C. An additional 1,151.7 g of formaldehyde was added to the reaction vessel. The reaction exothermed to a temperature of 96° C. The reaction mixture was stirred for 60 minutes. An additional 315.0 g of NaOH was then added to the reaction mixture. The mixture was stirred for 90 minutes with the reaction temperature cooling to less than 70° C. The comparative resin C2 had the following properties: 43.0 wt % solids, pH of 11.5, alkalinity of 6.0%, and a viscosity of 722 cP at 25° C., as measured on a Brookfield viscometer.

The straight cooked resins and the resin systems were applied to Southern Yellow Pine having a moisture content of 7 wt %. The spread rate was set at 30 g/ft$^2$ DGL. A press time series was performed straight cooked resins and the resin systems to determine the minimum press time for a 5-ply system Immediately after pressing, the panels were placed in a rack under forced air at room temperature to arrest any further curing of the resin. Dry-out resistance was performed using an oven at 93.3° C. After applying the mix to the veneer, the sheets were placed in the oven for 6-9 minutes. After drying the sheets, panels were immediately laid up and pressed Immediately after pressing, panels were placed in a rack under forced air at room temperature to arrest any further cure of the resin.

The results of the press time series of comparing the 2.2 MR straight cooked resin (comparative example C2) to the 2.2 CMR resin system (example Ex. 2) and the 2.1 MR straight cooked system (comparative example C1) compared to the 2.1 CMR resin system (example Ex. 1) both demonstrated that the resin systems delivered advantages. The 2.2 CMR system (example Ex. 2) made a significantly improved panel over the 2.2 MR straight cooked resin system (comparative example C2) at the lowest press time (see Table 1). At higher press times, the overall board strength was similar for both systems. The same trend was seen for the 2.1 CMR resin system (Ex. 1) and the 2.1 MR resin (comparative example C1). The greater TB strength for the 2.1 MR straight cooked resin (comparative example C1) coupled with the greater wood failure (WF) values for the 2.1 CMR system (example Ex. 1) at the 360 second press time suggests that a significant difference in wood quality was the cause, not a significant difference in resin performance.

TABLE 1

Resin systems vs. Straight Cooked Resins

| Example | Resin | Press Time (s) | Mean IB | Mean WF |
|---|---|---|---|---|
| C1 | 2.1 MR | 324 | 59.3 | 67.1 |
| Ex. 1 | 2.1 CMR | 324 | 115.9 | 92.1 |
| C1 | 2.1 MR | 342 | 103.0 | 74.2 |
| Ex. 1 | 2.1 CMR | 342 | 104.0 | 100.0 |
| C1 | 2.1 MR | 360 | 161.4 | 97.1 |
| Ex. 1 | 2.1 CMR | 360 | 122.3 | 99.6 |
| C1 | 2.1 MR | 378 | 158.4 | 99.2 |
| Ex. 1 | 2.1 CMR | 378 | 166.1 | 99.5 |
| C2 | 2.2 MR | 342 | 83.5 | 62.1 |
| Ex. 2 | 2.2 CMR | 342 | 133.0 | 79.6 |
| C2 | 2.2 MR | 362 | 153.1 | 75.4 |
| Ex. 2 | 2.2 CMR | 362 | 177.7 | 87.9 |
| C2 | 2.2 MR | 378 | 178.2 | 95.8 |
| Ex. 2 | 2.2 CMR | 378 | 173.4 | 87.5 |

For the 2.2 CMR resin system maintained the same level of dry-out resistance as the straight cooked resin (see Table 2).

TABLE 2

Resin systems vs. Straight Cooked Resins Under Dry-out Conditions

| Example | Resin | Dry-out (min) | Mean IB | Mean WF |
|---|---|---|---|---|
| C2 | 2.2 MR | 6 | 29.4 | 20.0 |
| Ex. 2 | 2.2 CMR | 6 | 33.5 | 32.1 |
| C2 | 2.2 MR | 9 | 0 | 0 |
| Ex. 2 | 2.2 CMR | 9 | 0 | 0 |

The composite resin system delivered greater speed than the straight cooked resin system while maintaining a similar level of dry-out resistance.

Embodiments of the present disclosure further relate to any one or more of the following paragraphs:

1. A resin system, comprising: a first aqueous resin comprising at least two polymerized monomers and a second aqueous resin comprising at least two polymerized monomers, wherein: the first aqueous resin is present in an amount of about 5 wt % to about 95 wt %, based on the total weight the resin system, the second aqueous resin is present in an amount of about 5 wt % to about 95 wt %, based on the total weight the resin system, and the at least two polymerized monomers of the first and second aqueous resins are the same monomers.

2. The resin system according to paragraph 1, wherein the first aqueous resin is a phenol-formaldehyde resin having a molar ratio of formaldehyde to phenol of about 1.5 to about 2.2, and the second aqueous resin is a phenol-formaldehyde resin having a molar ratio of formaldehyde to phenol of about 2.0 to about 2.6.

3. The resin system according to paragraph 1 or 2, wherein the first aqueous resin is a urea-formaldehyde resin having a molar ratio of formaldehyde to urea of about 0.25 to about 1.5, and the second aqueous resin is a urea-formaldehyde resin having a molar ratio of formaldehyde to urea of about 0.80 to about 2.1.

4. The resin system according to any one of paragraphs 1 to 3, wherein the first aqueous resin is a melamine-formaldehyde resin having a molar ratio of formaldehyde to melamine of about 0.25 to about 1.5 and the second aqueous resin is a melamine-formaldehyde resin having a molar ratio of formaldehyde to melamine of about 0.80 to about 2.1.

5. The resin system according to any one of paragraphs 1 to 4, wherein the first aqueous resin is a resorcinol-formaldehyde resin having a molar ratio of formaldehyde to resorcinol of about 0.4 to about 2.0 and the second aqueous resin is a resorcinol-formaldehyde resin having a molar ratio of formaldehyde to resorcinol of about 1.6 to about 2.8.

6. The resin system according to any one of paragraphs 1 to 5, wherein the first aqueous resin is a phenol-formaldehyde resin having a molar ratio of formaldehyde to phenol of about 1.5 to about 2.2 and the second aqueous resin is a resorcinol-formaldehyde resin having a molar ratio of formaldehyde to resorcinol of about 0.4 to about 1.0.

7. The resin system according to any one of paragraphs 1 to 6, wherein the first aqueous resin is a melamine-urea-formaldehyde resin with a molar ratio of F:(M+U), wherein F is the moles of formaldehyde, M is the moles of melamine, and U is the moles of urea, and the first molar ratio is about 0.25 to about 1.5 and the second aqueous resin is a melamine-urea-formaldehyde resin with a molar ratio of F:(M+U), wherein F is the moles of formaldehyde, M is the moles of melamine, and U is the moles of urea, and the first molar ratio is about 0.80 to about 2.1.

8. The resin system according to any one of paragraphs 1 to 7, wherein the first aqueous resin is a melamine-urea-formaldehyde resin with a molar ratio of F:(M+U), wherein F is the moles of formaldehyde, M is the moles of melamine, and U is the moles of urea, and the first molar ratio is about 0.25 to about 2.1 and the second aqueous resin is a urea-formaldehyde resin having a molar ratio of formaldehyde to urea of about 0.25 to about 2.1.

9. The resin system of according to any one of paragraph 1 to 8, wherein the first aqueous resin has a first weight average molecular weight, and wherein the second aqueous resin has a second weight average molecular weight.

10. The resin system according to paragraph 9, wherein the first and second weight average molecular weights are different.

11. The resin system according to any one of paragraphs 1 to 10, wherein the first resin is a phenol-formaldehyde resin having a weight average molecular weight of about 2,000 to about 3,500 and the second resin is a phenol-formaldehyde resin having a weight average molecular weight of about 2,750 to about 4,500.

12. The resin system according to any one of paragraphs 1 to 11, wherein the first resin is a urea-formaldehyde resin having a weight average molecular weight of about 200 to about 3,500 and the second resin is a urea-formaldehyde resin having weight average molecular weight of about 200 to about 6,000.

13. The resin system according to any one of paragraphs 1 to 12, wherein the first resin is a melamine-formaldehyde resin having a weight average molecular weight of about 200 to about 6,000 and the second resin is a melamine-formaldehyde resin having a weight average molecular weight of about 200 to about 6,000.

14. The resin system according to any one of paragraphs 1 to 13, wherein the first resin is a resorcinol-formaldehyde resin having a weight average molecular weight of about 200 to about 4,500 and the second resin is a resorcinol-formaldehyde resin having weight average molecular weight of about 200 to about 6,000.

15. The resin system according to any one of paragraphs 1 to 14, wherein the first resin is a phenol-formaldehyde resin having a weight average molecular weight of about 200 to about 6,000 and the second resin is a resorcinol-formaldehyde resin having weight average molecular weight of about 200 to about 6,000.

16. The resin system according to any one of paragraphs 1 to 15, wherein the first resin is a phenol-formaldehyde resin having a weight average molecular weight of about 2,000 to about 3,500 and the second resin is a resorcinol-formaldehyde resin having a weight average molecular weight of about 200 to about 6,000.

17. The resin system according to any one of paragraphs 1 to 16, wherein the first resin is a melamine-urea-formaldehyde resin having a weight average molecular weight of about 200 to about 6,000 and the second resin is a melamine-urea-formaldehyde resin having a weight average molecular weight of about 200 to about 6,000.

18. The resin system according to any one of paragraphs 1 to 17, wherein the first resin is a melamine-urea-formaldehyde resin having a weight average molecular weight of about 200 to about 6,000 and the second resin is a urea-formaldehyde resin having a weight average molecular weight of about 200 to about 6,000.

19. The resin system according to any one of paragraphs 1 to 18, wherein the first aqueous resin has a first number average molecular weight, and wherein the second aqueous resin has a second number average molecular weight.

20. The resin system according to any one of paragraphs 1 to 19, wherein the first and second number average molecular weights are different.

21. The method system according to any one of paragraphs 1 to 20, wherein the first resin is a phenol-formaldehyde resin having a number average molecular weight of about 950 to about 6,000 and the second resin is a phenol-formaldehyde resin having a number average molecular weight of about 1,100 to about 6,000.

22. The resin system according to any one of paragraphs 1 to 21, wherein the first resin is a urea-formaldehyde resin having a number average molecular weight of about 200 to about 6,000 and the second resin is a urea-formaldehyde resin having a number average molecular weight of about 200 to about 6,000.

23. The resin system according to any one of paragraphs 1 to 22, wherein the first resin is a melamine-formaldehyde resin having a number average molecular weight of about 200 to about 6,000 and the second resin is a melamine-formaldehyde resin having a number average molecular weight of about 200 to about 6,000.

24. The resin system according to any one of paragraphs 1 to 23, wherein the first resin is a resorcinol-formaldehyde resin having a number average molecular weight of about 200 to about 6,000 and the second resin is a resorcinol-formaldehyde resin having a number average molecular weight of about 200 to about 6,000.

25. The resin system according to any one of paragraphs 1 to 24, wherein the first resin is a phenol-formaldehyde resin having a number average molecular weight of about 200 to about 6,000 and the second resin is a resorcinol-formaldehyde resin having a number average molecular weight of about 200 to about 6,000.

26. The resin system according to any one of paragraphs 1 to 25, wherein the first resin is a phenol-formaldehyde resin having a number average molecular weight of about 2,000 to about 3,500 and the second resin is a resorcinol-formaldehyde resin having a weight number average molecular weight of about 200 to about 6,000.

27. The resin system according to any one of paragraphs 1 to 26, wherein the first resin is a melamine-urea-formaldehyde resin having a number average molecular weight of about 200 to about 6,000 and the second resin is a melamine-urea-formaldehyde resin having a number average molecular weight of about 200 to about 6,000.

28. The resin system according to any one of paragraphs 1 to 27, wherein the first resin is a melamine-urea-formaldehyde resin having a number average molecular weight of about 200 to about 6,000 and the second resin is a urea-formaldehyde resin having a number average molecular weight of about 200 to about 6,000.

29. The resin system according to any one of paragraphs 1 to 28, wherein the first aqueous resin has a first z-average molecular weight, and wherein the second aqueous resin has a second z-average molecular weight.

30. The resin system according to paragraph 29, wherein the first and second z-average molecular weights are different.

31. The resin system according to any one of paragraphs 1 to 30, wherein the first resin is a phenol-formaldehyde resin having a z-average molecular weight of about 200 to about 7,000 and the second resin is a phenol-formaldehyde resin having a z-average molecular weight of about 200 to about 8,000.

32. The resin system according to any one of paragraphs 1 to 31, wherein the first resin is a urea-formaldehyde resin having a z-average molecular weight of about 200 to about 6,000 and the second resin is a urea-formaldehyde resin having a z-average molecular weight of about 200 to about 6,000.

33. The resin system according to any one of paragraphs 1 to 32, wherein the first resin is a melamine-formaldehyde resin having a z-average molecular weight of about 200 to about 6,000 and the second resin is a melamine-formaldehyde resin having a z-average molecular weight of about 200 to about 6,000.

34. The resin system according to any one of paragraphs 1 to 33, wherein the first resin is a resorcinol-formaldehyde resin having a z-average molecular weight of about 200 to about 6,000 and the second resin is a resorcinol-formaldehyde resin having a z-average molecular weight of about 200 to about 6,000.

35. The resin system according to any one of paragraphs 1 to 34, wherein the first resin is a phenol-formaldehyde resin having a z-average molecular weight of about 200 to about 6,000 and the second resin is a resorcinol-formaldehyde resin having a z-average molecular weight of about 200 to about 6,000.

36. The resin system according to any one of paragraphs 1 to 35, wherein the first resin is a phenol-formaldehyde resin having a z-average molecular weight of about 2,000 to about 3,500 and the second resin is a resorcinol-formaldehyde resin having a z-average molecular weight of about 200 to about 6,000.

37. The resin system according to any one of paragraphs 1 to 36, wherein the first resin is a melamine-urea-formaldehyde resin having a z-average molecular weight of about 200 to about 6,000 and the second resin is a melamine-urea-formaldehyde resin having a z-average molecular weight of about 200 to about 6,000.

38. The resin system according to any one of paragraphs 1 to 37, wherein the first resin is a melamine-urea-formaldehyde resin having a z-average molecular weight of about 200 to about 6,000 and the second resin is a urea-formaldehyde resin having a z-average molecular weight of about 200 to about 6,000.

39. A method for making a composite product, comprising: contacting a plurality of lignocellulose substrates with a resin system comprising: a first aqueous resin comprising at least two polymerized monomers and second aqueous resin comprising at least two polymerized monomers, wherein: the first aqueous resin is present in an amount of about 5 wt % to about 95 wt %, based on the total weight the resin system, the second aqueous resin is present in an amount of about 5 wt % to about 95 wt %, based on the total weight the resin system, and the at least two polymerized monomers of the first and second aqueous resins are the same monomers; and at least partially curing the resin system to produce a composite product.

40. The method according to paragraph 39, wherein the first aqueous resin is a phenol-formaldehyde resin having a molar ratio of formaldehyde to phenol of about 1.5 to about 2.2, and the second aqueous resin is a phenol-formaldehyde resin having a molar ratio of formaldehyde to phenol of about 2.0 to about 2.6.

41. The method according to paragraph 39 or 40, wherein the first aqueous resin is a urea-formaldehyde resin having a molar ratio formaldehyde to urea of about 0.25 to about 1.5, and the second aqueous resin is a urea-formaldehyde resin having a molar ratio of formaldehyde to urea of about 0.80 to about 2.1.

42. The method according to any one of paragraphs 39 to 41, wherein the first aqueous resin is a melamine-formaldehyde resin having a molar ratio of formaldehyde to melamine of about 0.25 to about 1.5 and the second aqueous resin is a melamine-formaldehyde resin having a molar ratio of formaldehyde to melamine of about 0.80 to about 2.1.

43. The method according to any one of paragraphs 39 to 42, wherein the first aqueous resin is a resorcinol-formaldehyde resin having a molar ratio of formaldehyde to resorcinol of about 0.4 to about 2.0 and the second aqueous resin is a resorcinol-formaldehyde resin having a molar ratio of formaldehyde to resorcinol of about 1.6 to about 2.8.

44. The method according to any one of paragraphs 39 to 43, wherein the first aqueous resin is a phenol-formaldehyde resin having a molar ratio of formaldehyde to phenol of about 1.5 to about 2.2 and the second aqueous resin is a resorcinol-formaldehyde resin having a molar ratio of formaldehyde to resorcinol of about 0.4 to about 1.0.

45. The method according to any one of paragraphs 39 to 44, wherein the first aqueous resin is a melamine-urea-formaldehyde resin with a molar ratio of F:(M+U), wherein F is the moles of formaldehyde, M is the moles of melamine, and U is the moles of urea, and the first molar ratio is about 0.25 to about 1.5 and the second aqueous resin is a melamine-urea-formaldehyde resin with a molar ratio of F:(M+U), wherein F is the moles of formaldehyde, M is the moles of melamine, and U is the moles of urea, and the first molar ratio is about 0.80 to about 2.1.

46. The method according to any one of paragraphs 39 to 45, wherein the first aqueous resin is a melamine-urea-formaldehyde resin with a molar ratio of F:(M+U), wherein F is the moles of formaldehyde, M is the moles of melamine, and U is the moles of urea, and the first molar ratio is about 0.25 to about 2.1 and the second aqueous resin is a urea-formaldehyde resin having a molar ratio of formaldehyde to urea of about 0.25 to about 2.1.

47. The method according to any one of paragraphs 39 to 46, wherein the first aqueous resin has a first weight average molecular weight, and wherein the second aqueous resin has a second weight average molecular weight.

48. The method according to paragraph 47, wherein the first and second weight average molecular weights are different.

49. The method according to any one of paragraphs 39 to 48, wherein the first resin is a phenol-formaldehyde resin having a weight average molecular weight of about 2,000 to about 3,500 and the second resin is a phenol-formaldehyde resin having a weight average molecular weight of about 2,750 to about 4,500.

50. The method according to any one of paragraphs 39 to 49, wherein the first resin is a urea-formaldehyde resin having a weight average molecular weight of about 200 to about 3,500 and the second resin is a urea-formaldehyde resin having a weight average molecular weight of about 200 to about 6,000.

51. The method according to any one of paragraphs 39 to 50, wherein the first resin is a melamine-formaldehyde resin having a weight average molecular weight of about 200 to about 6,000 and the second resin is a melamine-formaldehyde resin having a weight average molecular weight of about 200 to about 6,000.

52. The method according to any one of paragraphs 39 to 51, wherein the first resin is a resorcinol-formaldehyde resin having a weight average molecular weight of about 200 to about 6,000 and the second resin is a resorcinol-formaldehyde resin having a weight average molecular weight of about 200 to about 6,000.

53. The method of according to any one of paragraphs 39 to 52, wherein the first resin is a phenol-formaldehyde resin having a weight average molecular weight of about 200 to about 6,000 and the second resin is a resorcinol-formaldehyde resin having a weight average molecular weight of about 200 to about 6,000.

54. The method of according to any one of paragraphs 39 to 53, wherein the first resin is a phenol-formaldehyde resin having a weight average molecular weight of about 2,000 to about 3,500 and the second resin is a resorcinol-formaldehyde resin having a weight average molecular weight of about 200 to about 6,000.

55. The method according to any one of paragraphs 39 to 54, wherein the first resin is a melamine-urea-formaldehyde resin having a weight average molecular weight of about 200 to about 6,000 and the second resin is a melamine-urea-formaldehyde resin having a weight average molecular weight of about 200 to about 6,000.

56. The method according to any one of paragraphs 39 to 55, wherein the first resin is a melamine-urea-formaldehyde resin having a weight average molecular weight of about 200 to about 6,000 and the second resin is a urea-formaldehyde resin having a weight average molecular weight of about 200 to about 6,000.

57. The method according to any one of paragraphs 39 to 56, wherein the first aqueous resin has a first number average molecular weight, and wherein the second aqueous resin has a second number average molecular weight.

58. The method according to paragraph 57, wherein the first and second number average molecular weights are different.

59. The method according to any one of paragraphs 39 to 58, wherein the first resin is a phenol-formaldehyde resin having a first number average molecular weight of about 950 to about 6,000 and the second resin is a phenol-formaldehyde resin having a second number average molecular weight of about 1,100 to about 6,000.

60. The method according to any one of paragraphs 39 to 59, wherein the first resin is a urea-formaldehyde resin having a number average molecular weight of about 200 to about 6,000 and the second resin is a urea-formaldehyde resin having a number average molecular weight of about 200 to about 6,000.

61. The method according to any one of paragraphs 39 to 60, wherein the first resin is a melamine-formaldehyde resin having a number average molecular weight of about 200 to about 6,000 and the second resin is a melamine-formaldehyde resin having a number average molecular weight of about 200 to about 6,000.

62. The method according to any one of paragraphs 39 to 61, wherein the first resin is a resorcinol-formaldehyde resin having a number average molecular weight of about 200 to about 6,000 and the second resin is a resorcinol-formaldehyde resin having a number average molecular weight of about 200 to about 6,000.

63. The method according to any one of paragraphs 39 to 62, wherein the first resin is a phenol-formaldehyde resin having a number average molecular weight of about 200 to about 6,000 and the second resin is a resorcinol-formaldehyde resin having a number average molecular weight of about 200 to about 6,000.

64. The method according to any one of paragraphs 39 to 63, wherein the first resin is a phenol-formaldehyde resin having a number average molecular weight of about 2,000 to about 3,500 and the second resin is a resorcinol-formaldehyde resin having a weight number average molecular weight of about 200 to about 6,000.

65. The method according to any one of paragraphs 39 to 64, wherein the first resin is a melamine-urea-formaldehyde resin having a number average molecular weight of about 200 to about 6,000 and the second resin is a melamine-urea-formaldehyde resin having a number average molecular weight of about 200 to about 6,000.

66. The method according to any one of paragraphs 39 to 65, wherein the first resin is a melamine-urea-formaldehyde resin having a number average molecular weight of about 200 to about 6,000 and the second resin is a urea-formaldehyde resin having a number average molecular weight of about 200 to about 6,000.

67. The method according to any one of paragraphs 39 to 66, wherein the first aqueous resin has a first number average molecular weight, and wherein the second aqueous resin has a second number average molecular weight.

68. The method according to any one of paragraphs 39 to 67, wherein the first aqueous resin has a first z-average molecular weight, and wherein the second aqueous resin has a second z-average molecular weight.

69. The method according to paragraph 68, wherein the first and second z-average molecular weights are different.

70. The method according to any one of paragraphs 39 to 69, wherein the first resin is a phenol-formaldehyde resin having a first z-average molecular weight of about 7,000 and the second resin is a phenol-formaldehyde resin having a second z-average molecular weight of about 8,000.

71. The resin system according to any one of paragraphs 39 to 70, wherein the first resin is a urea-formaldehyde resin having a z-average molecular weight of about 200 to about 6,000 and the second resin is a urea-formaldehyde resin having a z-average molecular weight of about 200 to about 6,000.

72. The method of according to any one of paragraphs 39 to 71, wherein the first resin is a melamine-formaldehyde resin having a z-average molecular weight of about 200 to about 6,000 and the second resin is a melamine-formaldehyde resin having a z-average molecular weight of about 200 to about 6,000.

73. The method of according to any one of paragraphs 39 to 72, wherein the first resin is a resorcinol-formaldehyde resin having a z-average molecular weight of about 200 to about 6,000 and the second resin is a resorcinol-formaldehyde resin having a z-average molecular weight of about 200 to about 6,000.

74. The method of according to any one of paragraphs 39 to 73, wherein the first resin is a phenol-formaldehyde resin having a z-average molecular weight of about 200 to about 6,000 and the second resin is a resorcinol-formaldehyde resin having a z-average molecular weight of about 200 to about 6,000.

75. The method of according to any one of paragraphs 39 to 74, wherein the first resin is a phenol-formaldehyde resin having a z-average molecular weight of about 2,000 to about 3,500 and the second resin is a resorcinol-formaldehyde resin having a z-average molecular weight of about 200 to about 6,000.

76. The method according to any one of paragraphs 39 to 75, wherein the first resin is a melamine-urea-formaldehyde resin having a z-average molecular weight of about 200 to about 6,000 and the second resin is a melamine-urea-formaldehyde resin having a z-average molecular weight of about 200 to about 6,000.

77. The method according to any one of paragraphs 39 to 76, wherein the first resin is a melamine-urea-formaldehyde resin having a z-average molecular weight of about 200 to about 6,000 and the second resin is a urea-formaldehyde resin having a z-average molecular weight of about 200 to about 6,000.

78. The resin system according to any one of paragraphs 1 to 38, wherein the first aqueous resin is a phenol-formaldehyde resin having a molar ratio of formaldehyde to phenol of about 1.5 to about 2.2, and a polydispersity index of about 3, and the second aqueous resin is a phenol-formaldehyde resin having a molar ratio of formaldehyde to phenol of about 2 to about 2.6, and polydispersity index of about 3.75.

79. A composite product, comprising: a plurality of substrates and an at least partially cured binder composition, wherein the binder composition, prior to curing, comprises: a first aqueous resin comprising at least two polymerized monomers and second aqueous resin comprising at least two polymerized monomers, wherein: the first aqueous resin is present in an amount of about 5 wt % to about 95 wt %, based on the total weight the resin system, the second aqueous resin is present in an amount of about 5 wt % to about 95 wt %, based on the total weight the resin system, and the at least two polymerized monomers of the first and second aqueous resins are the same monomer.

80. The composite product according to paragraph 79, wherein the plurality of substrates comprise lignocellulose substrates.

81. The composite product according to paragraph 79, wherein the composite product is a particleboard, a fiberboard, a plywood, an oriented strand board, a laminated veneer lumber, or a laminated veneer board.

82. A resin system, comprising: a first aqueous resin comprising at least two polymerized monomers and a second aqueous resin comprising at least two polymerized monomers, wherein: the first aqueous resin is present in an amount of about 5 wt % to about 95 wt %, based on the total weight the resin system, the second aqueous resin is present in an amount of about 5 wt % to about 95 wt %, based on the total weight the resin system, and the at least two polymerized monomers of the first and second aqueous resins are the same monomers.

83. The resin system according to paragraph 82, wherein the first aqueous resin is selected from the group consisting of: a phenol-formaldehyde resin having a molar ratio of formaldehyde to phenol of about 1.5 to about 2.2, a urea-formaldehyde resin having a molar ratio formaldehyde to urea of about 0.25 to about 1.5, a melamine-formaldehyde resin having a molar ratio of formaldehyde to melamine of about 0.25 to about 1.5, a resorcinol-formaldehyde resin having a molar ratio of formaldehyde to resorcinol of about 0.4 to about 2.0, a melamine-urea-formaldehyde resin with a molar ratio of F:(M+U), wherein F is the moles of formaldehyde, M is the moles of melamine, and U is the moles of urea, and the first molar ratio is about 0.25 to about 1.5, a melamine-urea-formaldehyde resin with a molar ratio of F:(M+U), wherein F is the moles of formaldehyde, M is the moles of melamine, and U is the moles of urea, and the first molar ratio is about 0.25 to about 2.1, and wherein the second aqueous resin is selected from the group consisting of: a phenol-formaldehyde resin having a molar ratio of formaldehyde to phenol of about 2.0 to about 2.6, a urea-formaldehyde resin having a molar ratio of formaldehyde to urea of about 0.80 to about 2.1, a melamine-formaldehyde resin having a molar ratio of formaldehyde to melamine of about 0.80 to about 2, a resorcinol-formaldehyde resin having a molar ratio of formaldehyde to resorcinol of about 1.6 to about 2, a resorcinol-formaldehyde resin having a molar ratio of formaldehyde to resorcinol of about 0.4 to about 1.0, a melamine-urea-formaldehyde resin with a molar ratio of F:(M+U), wherein F is the moles of formaldehyde, M is the moles of melamine, and U is the moles of urea, and the first molar ratio is about 0.80 to about 2.1, and a urea-formaldehyde resin having a molar ratio of formaldehyde to urea of about 0.25 to about 2.1.

84. The resin system according to paragraph 82 or 83, wherein the first aqueous resin has a first weight average molecular weight, and wherein the second aqueous resin has a second weight average molecular weight.

85. The resin system according to paragraph 84, wherein the first and second weight average molecular weights are different.

86. The resin system according to any one of paragraphs 82 to 85, wherein the first resin is selected from the group consisting of: a phenol-formaldehyde resin having a weight average molecular weight of about 2,000 to about 3,500, a urea-formaldehyde resin having a weight average molecular weight of about 200 to about 3,500, a melamine-formaldehyde resin having a weight average molecular weight of about 200 to about 6,000, a resorcinol-formaldehyde resin having a weight average molecular weight of about 200 to about 4,500, a phenol-formaldehyde resin having a weight average molecular weight of about 200 to about 6,000, a phenol-formaldehyde resin having a weight average molecular weight of about 2,000 to about 3,500, and a melamine-urea-formaldehyde resin having a weight average molecular weight of about 200 to about 6,000, and wherein the second resin is selected from the group consisting of: a phenol-formaldehyde resin having a weight average molecular weight of about 2,750 to about 4,500, a urea-formaldehyde resin having a weight average molecular weight of about 200 to about 6,000, a melamine-formaldehyde resin having a weight average molecular weight of about 200 to about 6,000, a resorcinol-formaldehyde resin having a weight average molecular weight of about 200 to about 6,000, and a melamine-urea-formaldehyde resin having a weight average molecular weight of about 200 to about 6,000.

87. The resin system according to any one of paragraphs 82 to 86, wherein the first aqueous resin has a first number average molecular weight, wherein the second aqueous resin has a second number average molecular weight, and wherein the first and second number average molecular weights are different.

88. The resin system according to any one of paragraphs 82 to 87, wherein the first aqueous resin has a first z-average molecular weight, wherein the second aqueous resin has a second z-average molecular weight, and wherein the first and second z-average molecular weights are different.

89. The resin system according to any one of paragraphs 82 to 88, wherein the first aqueous resin is a phenol-formaldehyde resin having a molar ratio of formaldehyde to phenol of about 1.5 to about 2.2 and a polydispersity index of about 3, and the second aqueous resin is a phenol-formaldehyde resin having a molar ratio of formaldehyde to phenol of about 2 to about 2.6, and polydispersity index of about 3.75.

90. A method for making a composite product, comprising: contacting a plurality of lignocellulose substrates with a resin system comprising: a first aqueous resin comprising at least two polymerized monomers and second aqueous resin comprising at least two polymerized monomers, wherein: the first aqueous resin is present in an amount of about 5 wt % to about 95 wt %, based on the total weight the resin system, the second aqueous resin is present in an amount of about 5 wt % to about 95 wt %, based on the total weight the resin system, and the at least two polymerized monomers of the first and second aqueous resins are the same monomers; and at least partially curing the resin system to produce a composite product.

91. The method according to paragraph 90, wherein the first aqueous resin is selected from the group consisting of: a phenol-formaldehyde resin having a molar ratio of formaldehyde to phenol of about 1.5 to about 2.2, a urea-formaldehyde resin having a molar ratio formaldehyde to urea of about 0.25 to about 1.5, a melamine-formaldehyde resin having a molar ratio of formaldehyde to melamine of about 0.25 to about 1.5, a resorcinol-formaldehyde resin having a molar ratio of formaldehyde to resorcinol of about 0.4 to about 2.0, a melamine-urea-formaldehyde resin with a molar ratio of F:(M+U), wherein F is the moles of formaldehyde, M is the moles of melamine, and U is the moles of urea, and the first molar ratio is about 0.25 to about 1.5, a melamine-urea-formaldehyde resin with a molar ratio of F:(M+U), wherein F is the moles of formaldehyde, M is the moles of melamine, and U is the moles of urea, and the first molar ratio is about 0.25 to about 2.1, and wherein the second aqueous resin is selected from the group consisting of: a phenol-formaldehyde resin having a molar ratio of formaldehyde to phenol of about 2.0 to about 2.6, a urea-formaldehyde resin having a molar ratio of formaldehyde to urea of about 0.80 to about 2.1, a melamine-formaldehyde resin having a molar ratio of formaldehyde to melamine of about 0.80 to about 2, a resorcinol-formaldehyde resin having a molar ratio of formaldehyde to resorcinol of about 1.6 to about 2, a resorcinol-formaldehyde resin having a molar ratio of formaldehyde to resorcinol of about 0.4 to about 1.0, a melamine-urea-formaldehyde resin with a molar ratio of F:(M+U), wherein F is the moles of formaldehyde, M is the moles of melamine, and U is the moles of urea, and the first molar ratio is about 0.80 to about 2.1, and a urea-formaldehyde resin having a molar ratio of formaldehyde to urea of about 0.25 to about 2.1.

92. The method according to paragraph 90 or 91, wherein the first aqueous resin has a first weight average molecular weight, and wherein the second aqueous resin has a second weight average molecular weight.

93. The method according to paragraph 92, wherein the first and second weight average molecular weights are different.

94. The method according to any one of paragraphs 90 to 93, wherein the first resin is selected from the group consisting of: a phenol-formaldehyde resin having a weight average molecular weight of about 2,000 to about 3,500, a urea-formaldehyde resin having a weight average molecular weight of about 200 to about 3,500, a melamine-formaldehyde resin having a weight average molecular weight of about 200 to about 6,000, a resorcinol-formaldehyde resin having a weight average molecular weight of about 200 to about 4,500, a phenol-formaldehyde resin having a weight average molecular weight of about 200 to about 6,000, a phenol-formaldehyde resin having a weight average molecular weight of about 2,000 to about 3,500, and a melamine-urea-formaldehyde resin having a weight average molecular weight of about 200 to about 6,000, and wherein the second resin is selected from the group consisting of: a phenol-formaldehyde resin having a weight average molecular weight of about 2,750 to about 4,500, a urea-formaldehyde resin having a weight average molecular weight of about 200 to about 6,000, a melamine-formaldehyde resin having a weight average molecular weight of about 200 to about 6,000, a resorcinol-formaldehyde resin having a weight average molecular weight of about 200 to about 6,000, and a melamine-urea-formaldehyde resin having a weight average molecular weight of about 200 to about 6,000.

95. The method according to any one of paragraphs 90 to 94, wherein the first aqueous resin has a first number average molecular weight, wherein the second aqueous resin has a second number average molecular weight, and wherein the first and second number average molecular weights are different.

96. The method according to any one of paragraphs 90 to 95, wherein the first aqueous resin has a first z-average molecular weight, wherein the second aqueous resin has a second z-average molecular weight, and wherein the first and second z-average molecular weights are different.

97. A composite product, comprising: a plurality of substrates and an at least partially cured resin system, wherein the resin system, prior to curing, comprises: a first aqueous resin comprising at least two polymerized monomers and second aqueous resin comprising at least two polymerized monomers, wherein: the first aqueous resin is present in an amount of about 5 wt % to about 95 wt %, based on the total weight the resin system, the second aqueous resin is present in an amount of about 5 wt % to about 95 wt %, based on the total weight the resin system, and the at least two polymerized monomers of the first and second aqueous resins are the same monomer.

98. The composite product according to paragraph 97, wherein the plurality of substrates comprise lignocellulose substrates.

99. The composite product according to paragraph 97 or 98, wherein the composite product is particleboard, fiberboard, plywood, oriented strand board, laminated veneer lumber, or laminated veneer board.

100. The composite product according to any one of paragraphs 97 to 99, wherein the first aqueous resin is selected from the group consisting of: a phenol-formaldehyde resin having a molar ratio of formaldehyde to phenol of about 1.5 to about 2.2, a urea-formaldehyde resin having a molar ratio formaldehyde to urea of about 0.25 to about 1.5, a melamine-formaldehyde resin having a molar ratio of formaldehyde to melamine of about 0.25 to about 1.5, a resorcinol-formaldehyde resin having a molar ratio of formaldehyde to resorcinol of about 0.4 to about 2.0, a melamine-urea-formaldehyde resin with a molar ratio of F:(M+U), wherein F is the moles of formaldehyde, M is the moles of melamine, and U is the moles of urea, and the first molar ratio is about 0.25 to about 1.5, a melamine-urea-formaldehyde resin with a molar ratio of F:(M+U), wherein F is the moles of formaldehyde, M is the moles of melamine, and U is the moles of urea, and the first molar ratio is about 0.25 to about 2.1, and wherein the second aqueous resin is selected from the group consisting of: a phenol-formaldehyde resin having a molar ratio of formaldehyde to phenol of about 2.0 to about 2.6, a urea-formaldehyde resin having a molar ratio of formaldehyde to urea of about 0.80 to about 2.1, a melamine-formaldehyde resin having a molar ratio of formaldehyde to melamine of about 0.80 to about 2, a resorcinol-formaldehyde resin having a molar ratio of formaldehyde to resorcinol of about 1.6 to about 2, a resorcinol-formaldehyde resin having a molar ratio of formaldehyde to resorcinol of about 0.4 to about 1.0, a melamine-urea-formaldehyde resin with a molar ratio of F:(M+U), wherein F is the moles of formaldehyde, M is the moles of melamine, and U is the moles of urea, and the first molar ratio is about 0.80 to about 2.1, and a urea-formaldehyde resin having a molar ratio of formaldehyde to urea of about 0.25 to about 2.1.

101. The composite product according to any one of paragraphs 97 to 100, wherein the first aqueous resin has a first weight average molecular weight, wherein the second aqueous resin has a second weight average molecular weight, and wherein the first and second weight average molecular weights are different.

102. The resin system, method, or composite product according to any one of paragraphs 82 to 101, wherein the resin system comprises at least three resins.

103. The resin system, method, or composite product according to any one of paragraphs 82 to 101, wherein the resin system comprises at least four resins.

104. The resin system, method, or composite product according to any one of paragraphs 82 to 101, wherein the resin system comprises at least five resins.

105. The resin system, method, or composite product according to any one of paragraphs 82 to 104, wherein the resin system has a bimodal weight average molecular weight.

106. The resin system, method, or composite product according to any one of paragraphs 82 to 104, wherein the resin has a monomodal weight average molecular weight.

107. The resin system, method, or composite product according to any one of paragraphs 82 to 106, wherein the resin system has a solids content of at least 20 wt %.

108. The resin system, method, or composite product according to any one of paragraphs 82 to 106, wherein the resin system has a solids content of at least 30 wt %.

109. The resin system, method, or composite product according to any one of paragraphs 82 to 106, wherein the resin system has a solids content of at least 35 wt %.

110. The resin system, method, or composite product according to any one of paragraphs 82 to 106, wherein the resin system has a solids content of at least 45 wt %.

111. The resin system, method, or composite product according to any one of paragraphs 82 to 106, wherein the resin system has a solids content of about 20 wt % to about 80 wt %.

112. The resin system, method, or composite product according to any one of paragraphs 82 to 111, wherein the resin system has a viscosity of about 1 cP to about 2,200 cP at a temperature of 25° C.

113. The resin system, method, or composite product according to any one of paragraphs 82 to 112, wherein the resin system has a pH of about 1 to about 12.

114. The resin system, method, or composite product according to any one of paragraphs 82 to 113, wherein the resin system contains less than 3 wt % free formaldehyde.

115. The resin system, method, or composite product according to any one of paragraphs 82 to 114, wherein the resin system contains less than 3 wt % free phenol.

116. The resin system, method, or composite product according to any one of paragraphs 82 to 114, wherein the first and second aqueous resins have different molecular weights.

117. The resin system, method, or composite product according to any one of paragraphs 82 to 117, wherein a molar ratio of the at least two polymerized monomers of the first aqueous resin is different than the molar ratio of the at least two polymerized monomers of the second aqueous resin.

118. The resin system, method, or composite product according to any one of paragraphs 82 to 117, wherein the first and second aqueous resins have different molecular weights and wherein a molar ratio of the at least two polymerized monomers of the first aqueous resin is different than the molar ratio of the at least two polymerized monomers of the second aqueous resin.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A method for making a composite product, comprising:
   contacting a plurality of lignocellulose substrates with a resin system comprising:

a first aqueous resin comprising at least two polymerized monomers and a second aqueous resin comprising at least two polymerized monomers, wherein:

the first aqueous resin is present in an amount of about 5 wt % to about 95 wt %, based on the total weight of the resin system, the second aqueous resin is present in an amount of about 5 wt % to about 95 wt %, based on the total weight of the resin system, the at least two polymerized monomers of the first and second aqueous resins are the same monomers, the first aqueous resin is selected from the group consisting of:

a first phenol-formaldehyde resin having a molar ratio of formaldehyde to phenol of about 1.5 to about 2.2, a first urea-formaldehyde resin having a molar ratio of formaldehyde to urea of about 0.25 to about 1.5, a first melamine-formaldehyde resin having a molar ratio of formaldehyde to melamine of about 0.25 to about 1.5, a first resorcinol-formaldehyde resin having a molar ratio of formaldehyde to resorcinol of about 0.4 to about 2, and a first melamine-urea-formaldehyde resin having a molar ratio of F:(M+U), wherein F is the moles of formaldehyde, M is the moles of melamine, U is the moles of urea, and the molar ratio of F:(M+U) is about 0.25 to about 2.1, the second aqueous resin is selected from the group consisting of:

a second phenol-formaldehyde resin having a molar ratio of formaldehyde to phenol of about 2 to about 2.6, a second urea-formaldehyde resin having a molar ratio of formaldehyde to urea of about 0.25 to about 2.1, a second melamine-formaldehyde resin having a molar ratio of formaldehyde to melamine of about 0.8 to about 2, a second resorcinol-formaldehyde resin having a molar ratio of formaldehyde to resorcinol of about 1.6 to about 2, a third resorcinol-formaldehyde resin having a molar ratio of formaldehyde to resorcinol of about 0.4 to about 1, and a second melamine-urea-formaldehyde resin having a molar ratio of F:(M+U), wherein F is the moles of formaldehyde, M is the moles of melamine, U is the moles of urea, and the molar ratio of F:(M+U) is about 0.8 to about 2.1; and at least partially curing the resin system to produce a composite product.

2. The method of claim 1, wherein the first aqueous resin has a first weight average molecular weight, wherein the second aqueous resin has a second weight average molecular weight, and wherein the first and second weight average molecular weights are the same or different.

3. The method of claim 1, wherein the first aqueous resin has a first number average molecular weight, wherein the second aqueous resin has a second number average molecular weight, and wherein the first and second number average molecular weights are different.

4. The method of claim 1, wherein the first aqueous resin has a first z-average molecular weight, wherein the second aqueous resin has a second z-average molecular weight, and wherein the first and second z-average molecular weights are different.

5. The method of claim 1, wherein the first aqueous resin comprises the first phenol-formaldehyde resin.

6. The method of claim 1, wherein the first aqueous resin comprises the first urea-formaldehyde resin and the second aqueous resin comprises the second urea-formaldehyde resin.

7. The method of claim 1, wherein the first aqueous resin comprises the first melamine-formaldehyde resin and the second aqueous resin comprises the second melamine-formaldehyde resin.

8. The method of claim 1, wherein the first aqueous resin comprises the first resorcinol-formaldehyde resin and the second aqueous resin comprises the second resorcinol-formaldehyde resin.

9. The method of claim 1, wherein the first aqueous resin comprises the first resorcinol-formaldehyde resin and the second aqueous resin comprises the third resorcinol-formaldehyde resin.

10. The method of claim 1, wherein the first aqueous resin comprises the first melamine-urea-formaldehyde resin and the second aqueous resin comprises the second melamine-urea-formaldehyde resin.

11. The method of claim 1, wherein the resin system has a viscosity of about 1 cP to about 2,200 cP at a temperature of 25° C.

12. The method of claim 1, wherein the composite product is a particleboard, a fiberboard, a plywood, an oriented strand board, a laminated veneer lumber, or a laminated veneer board.

13. A method for making a composite product, comprising:

contacting a plurality of lignocellulose substrates with a resin system comprising:

a first aqueous resin comprising at least two polymerized monomers and a second aqueous resin comprising at least two polymerized monomers, wherein:

the first aqueous resin is present in an amount of about 5 wt % to about 95 wt %, based on the total weight of the resin system, the second aqueous resin is present in an amount of about 5 wt % to about 95 wt %, based on the total weight of the resin system, the at least two polymerized monomers of the first and second aqueous resins are the same monomers, the first aqueous resin is selected from the group consisting of:

a first urea-formaldehyde resin having a weight average molecular weight of about 200 to about 3,500, a first melamine-formaldehyde resin having a weight average molecular weight of about 200 to about 6,000, a first resorcinol-formaldehyde resin having a weight average molecular weight of about 200 to about 4,500, a first phenol-formaldehyde resin having a weight average molecular weight of about 200 to about 6,000, and a first melamine-urea-formaldehyde resin having a weight average molecular weight of about 200 to about 6,000, and the second aqueous resin is selected from the group consisting of:

a second phenol-formaldehyde resin having a weight average molecular weight of about 2,750 to about 4,500, a second urea-formaldehyde resin having a weight average molecular weight of about 200 to about 6,000, a second melamine-formaldehyde resin having a weight average molecular weight of about 200 to about 6,000, a second resorcinol-formaldehyde resin having a weight average molecular weight of about 200 to about 6,000, and a second melamine-urea-formaldehyde resin having a weight average molecular weight of about 200 to about 6,000.

14. The method of claim 13, wherein the first aqueous resin comprises the first phenol-formaldehyde resin.

15. The method of claim 13, wherein the first aqueous resin comprises the first urea-formaldehyde resin and the second aqueous resin comprises the second urea-formaldehyde resin.

16. The method of claim 13, wherein the first aqueous resin comprises the first melamine-formaldehyde resin and the second aqueous resin comprises the second melamine-formaldehyde resin.

17. The method of claim 13, wherein the first aqueous resin comprises the first resorcinol-formaldehyde resin.

18. The method of claim 13, wherein the first aqueous resin comprises the first melamine-urea-formaldehyde resin and the second aqueous resin comprises the second melamine-urea-formaldehyde resin.

19. The method of claim 13, wherein the resin system has a viscosity of about 1 cP to about 2,200 cP at a temperature of 25° C.

20. The method of claim 13, wherein the composite product is a particleboard, a fiberboard, a plywood, an oriented strand board, a laminated veneer lumber, or a laminated veneer board.

* * * * *